US012186954B2

(12) United States Patent
Yeh et al.

(10) Patent No.: US 12,186,954 B2
(45) Date of Patent: Jan. 7, 2025

(54) INJECTION MOLDING SYSTEM HAVING MOVABLE MOLDING DEVICE AND METHOD THEREOF

(71) Applicant: KING STEEL MACHINERY CO., LTD., Taichung (TW)

(72) Inventors: Liang-Hui Yeh, Taichung (TW); Ching-Hao Chen, Taichung (TW)

(73) Assignee: KING STEEL MACHINERY CO., LTD., Taichung (TW)

( * ) Notice: Subject to any disclaimer, the term of this patent is extended or adjusted under 35 U.S.C. 154(b) by 82 days.

(21) Appl. No.: 17/153,710

(22) Filed: Jan. 20, 2021

(65) Prior Publication Data

US 2021/0402661 A1 Dec. 30, 2021

Related U.S. Application Data

(60) Provisional application No. 63/043,742, filed on Jun. 24, 2020.

(51) Int. Cl.
*B29C 45/53* (2006.01)
*B29C 45/04* (2006.01)

(52) U.S. Cl.
CPC .......... *B29C 45/53* (2013.01); *B29C 45/0433* (2013.01)

(58) Field of Classification Search
CPC ........................... B29C 45/53; B29C 45/0433
USPC .................................................... 264/328.11
See application file for complete search history.

(56) References Cited

U.S. PATENT DOCUMENTS 3,830,613 A * 8/1974 Aoki ................... B29C 45/1781
425/DIG. 221
6,558,590 B1 * 5/2003 Stewart ................. B29C 43/183
425/149

FOREIGN PATENT DOCUMENTS

| CN | 1593888 A | 3/2005 |
| CN | 207388229 U | 5/2018 |
| GB | 863589 A | 3/1961 |
| JP | S38-4180 B | 4/1963 |
| JP | 1975017963 Y | 6/1975 |

(Continued)

OTHER PUBLICATIONS

Zhang (English Translation of JP325134) (Year: 1998).*

(Continued)

*Primary Examiner* — Michael A Tolin
*Assistant Examiner* — Hana C Page
(74) *Attorney, Agent, or Firm* — WPAT Law; Anthony King

(57) ABSTRACT

An injection molding system includes an injection station, a molding device, and a plunger. The injection station includes a platform including an opening and an injector over the platform. The molding device is disposed between the platform and the injector and over the opening, wherein the molding device includes a mold cavity and a clamping unit for clamping the molding device. The plunger under the platform, wherein the plunger includes a base and a rod extendable through the opening toward the molding device and retractable toward the base. An injection molding method includes conveying a molding device to an injection station and disposing the molding device between an injector and a platform; disposing a plunger under the platform; moving the injector towards the molding device; applying a plunging force on the molding device by extending the rod (Continued)

through the opening; and injecting a molding material into a mold cavity.

20 Claims, 18 Drawing Sheets

(56) References Cited

FOREIGN PATENT DOCUMENTS

| | | |
|---|---|---|
| JP | S62117711 A | 5/1987 |
| JP | S6477510 A | 3/1989 |
| JP | H02165922 A | 6/1990 |
| JP | H5-185463 A | 7/1993 |
| JP | 2680088 B2 | 8/1997 |
| JP | 3197926 B2 | 8/2001 |
| JP | 2006056166 A | 3/2006 |
| JP | 2008-179031 A | 8/2008 |
| KR | 1019960007862 B1 | 6/1996 |
| TW | 325134 | 1/1998 |
| TW | M590094 U | 2/2020 |
| WO | 2007071594 A1 | 6/2007 |

OTHER PUBLICATIONS

Hidenori (English Translation of JPH05185463). (Year: 1993).*
English Translation of Masato (JPH02165920A) (Year: 1990).*
English Translation of Okazoe (JP2006056166A) (Year: 2006).*
Lang (English Translation of CN207388229) (Year: 2018).*
Notice of allowance from the Japan Intellectual Property Office of JP patent application No. 2021-072760 dated Jul. 5, 2022.
Office action, Cited References and Search report dated Jun. 1, 2022 issued by the Korean Intellectual Property Office (KIPO) for the Korean application No. 10-2021-0075958.
Office Action and Cited References dated Feb. 15, 2022 issued by the Japan Intellectual Property Office for Japanese patent application No. 2021-072760.
Office action, Cited References and Search report dated Jan. 7, 2022 issued by the Taiwan Intellectual Property Office (TIPO) for the Taiwanese counterpart application No. 110117595.
Extended Search Report dated Nov. 10, 2021 issued by the European Patent Office for the EP counterpart application No. 21174108.7-1014.
Notice of allowance from the Korean Intellectual Property Office (KIPO) of Korean application No. 10-2021-0075958 dated Dec. 2, 2022.

* cited by examiner

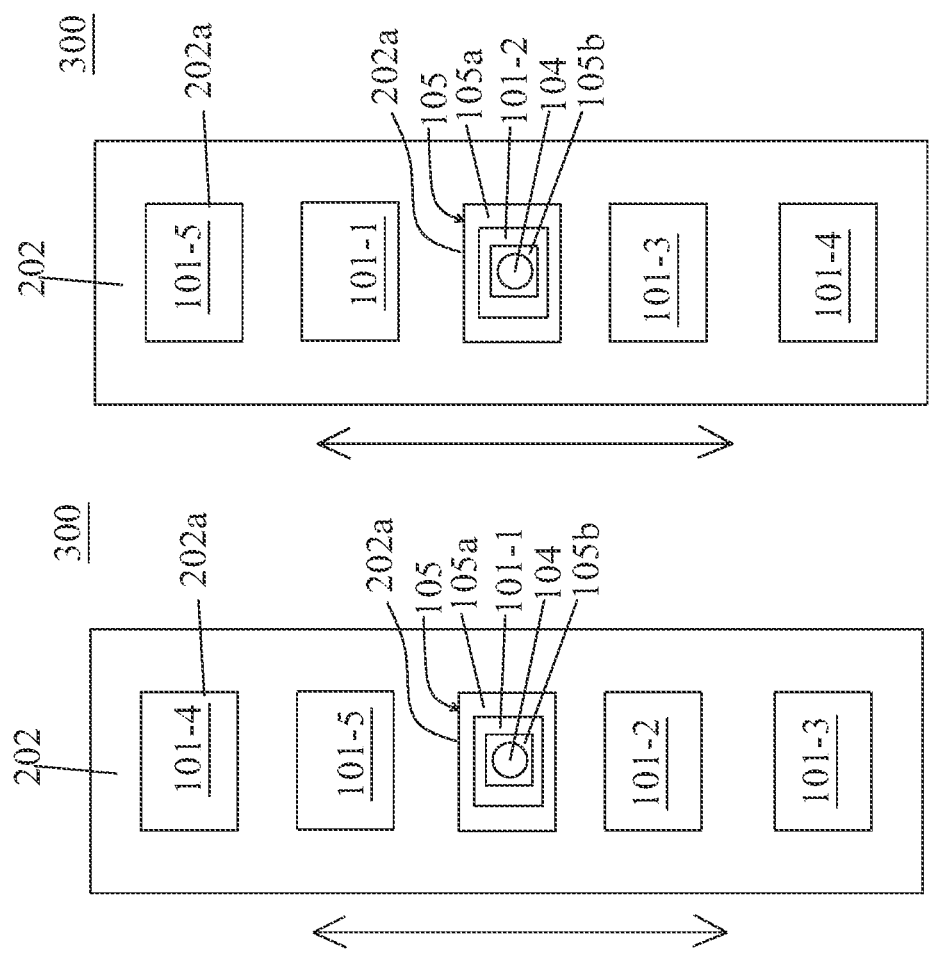

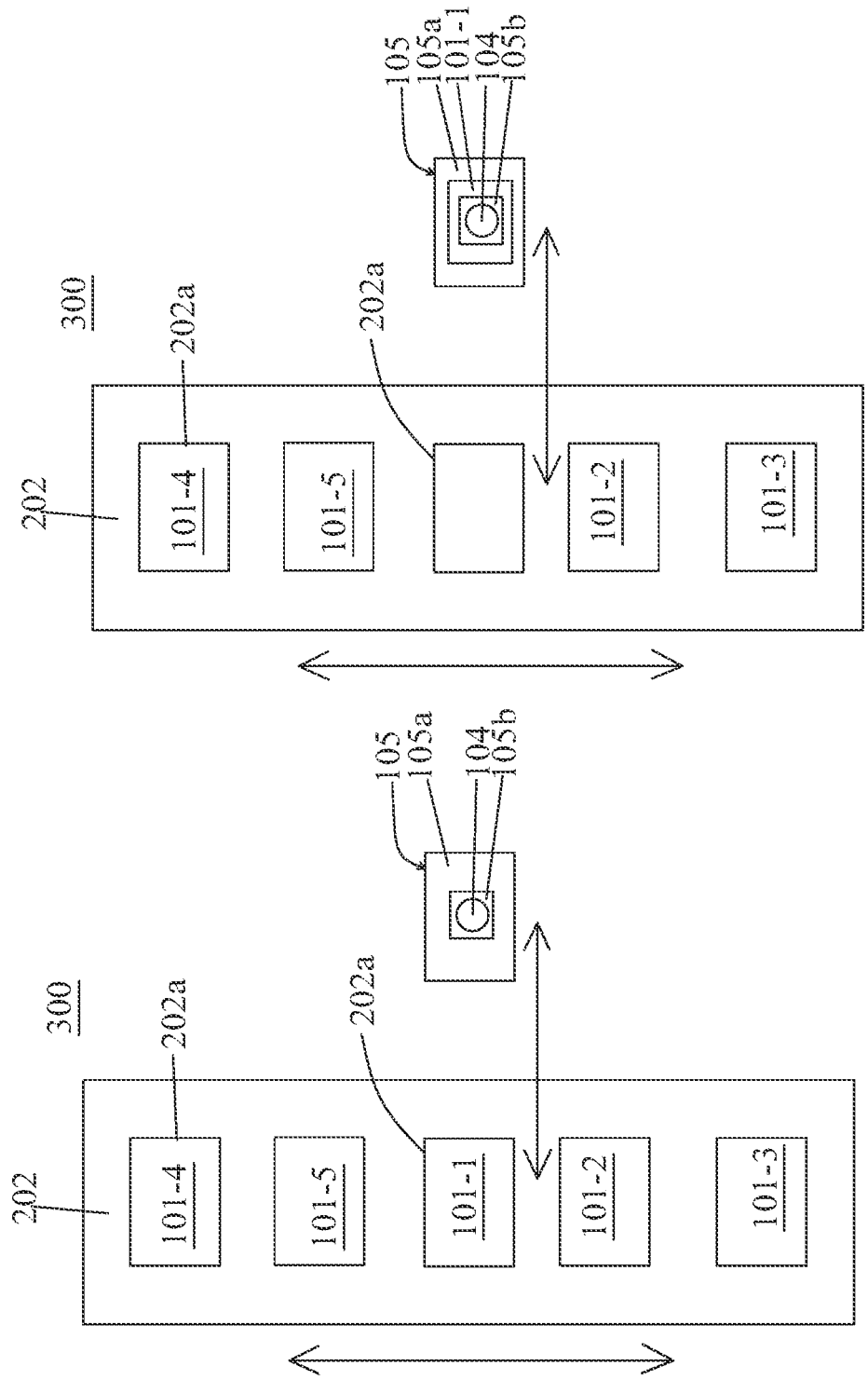

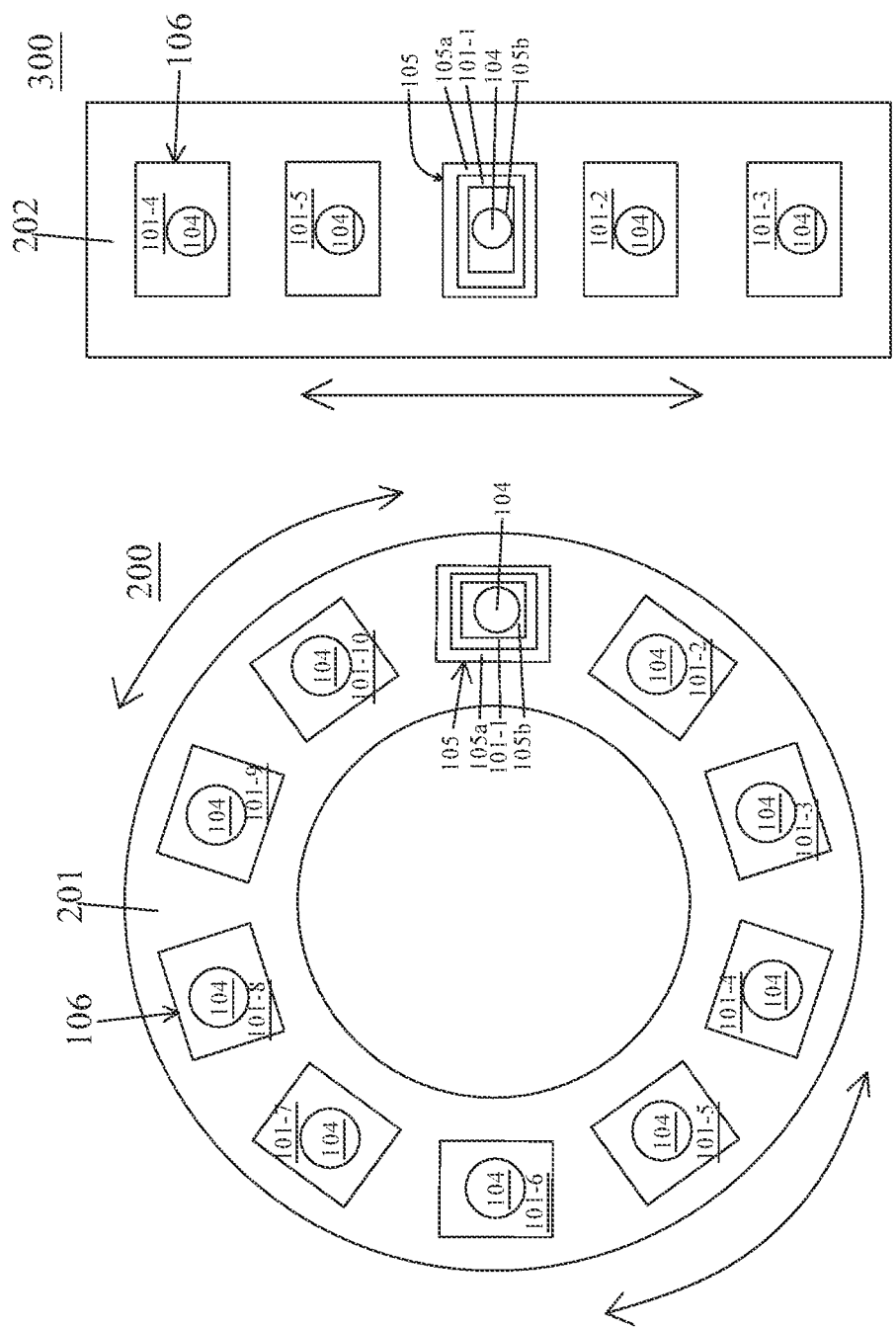

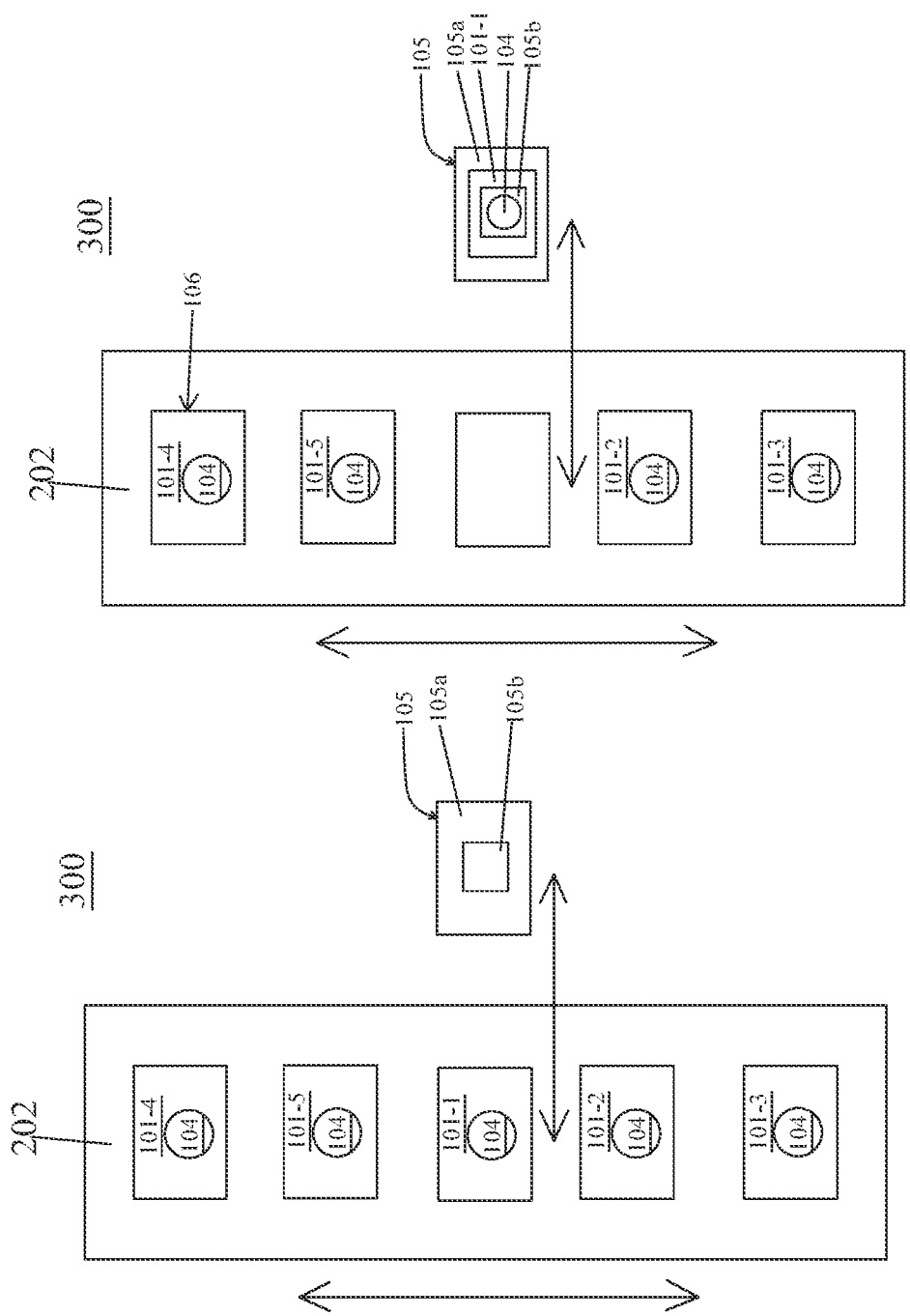

INJECTION MOLDING SYSTEM HAVING MOVABLE MOLDING DEVICE AND METHOD THEREOF

CROSS-REFERENCE TO RELATED APPLICATION

This application claims priority of U.S. provisional application Ser. No. 63/043,742, filed on Jun. 24, 2020, which is incorporated by reference in their entirety.

TECHNICAL FIELD

The present invention is related to an injection molding system and a method of using the same, and, in particular, to an injection molding system having a movable molding device and a method thereof of using the same.

BACKGROUND

Foamed polymeric material has many advantages, such as high strength, low weight, impact resistance, thermal insulation, and others. Articles can be made by injection molding. For example, after the polymeric material is melted and mixed with a blowing agent to form a mixture, a force or pressure is applied to the mixture to inject the mixture into a cavity of a mold, and the mixture is foamed and cooled in the cavity to form the article.

However, it is necessary to improve the properties of the article made by the injection molding system, such as fixing the molding device at a specific position. Therefore, there is a need for improvements to structures of the injection-molding system and the method for using the same.

BRIEF SUMMARY OF THE INVENTION

One purpose of the present invention is to provide an extruding system and a method of extruding a mixture.

According to one embodiment of the present disclosure, an injection molding system is disclosed. The injection molding system includes an injection station, a molding device, and a plunger. The injection station includes a platform and an injector disposed over the platform, wherein the platform includes a first opening extending through the platform. The molding device is disposed between the platform and the injector and over the first opening, wherein the molding device includes a mold cavity and a clamping unit for clamping the molding device. The plunger is disposed under the platform, wherein the plunger includes a base and a rod, the rod is extendable through the first opening toward the molding device and retractable toward the base.

According to one embodiment of the present disclosure, an injection molding method is disclosed. The injection molding method includes providing an injection station including a platform and an injector disposed over the platform, wherein the platform includes a first opening extending through the platform; conveying a molding device to the injection station and disposing the molding device between the injector and the platform, wherein the molding device includes a first mold, a second mold over the first mold and a mold cavity defined by the first mold and the second mold; disposing a plunger under the molding device and the platform, wherein the plunger includes a base and a rod extendable toward the molding device and retractable toward the base; moving the injector towards the molding device to communicate with the mold cavity; applying a plunging force on the molding device by extending the rod through the first opening towards the molding device; and injecting a molding material from the injector into the mold cavity.

According to one embodiment of the present disclosure, an injection molding method is disclosed. The injection molding method includes providing a carrier, wherein a first molding device and a second molding device are held by the carrier; providing an injection station including a platform and an injector disposed over the platform, wherein the platform includes a first opening extending through the platform; providing a plunger disposed under the platform, wherein the plunger includes a base and a rod extendable from and retractable toward the base; moving the first molding device into the injection station and disposing the first molding device between the injector and the platform; providing a plunging force to the first molding device by extending the rod through the first opening to contact the first molding device; injecting a molding material from the injector into the first molding device; withdrawing the injector and the rod from the first molding device after injection; moving the first molding device from the injection station; and moving the second molding device into the injection station and disposing the second molding device between the injector and the platform.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIGS. 9-22 are schematic top views illustrating exemplary operations in an injection molding method according to one embodiment of the present disclosure.

DETAILED DESCRIPTION

Figure 1:
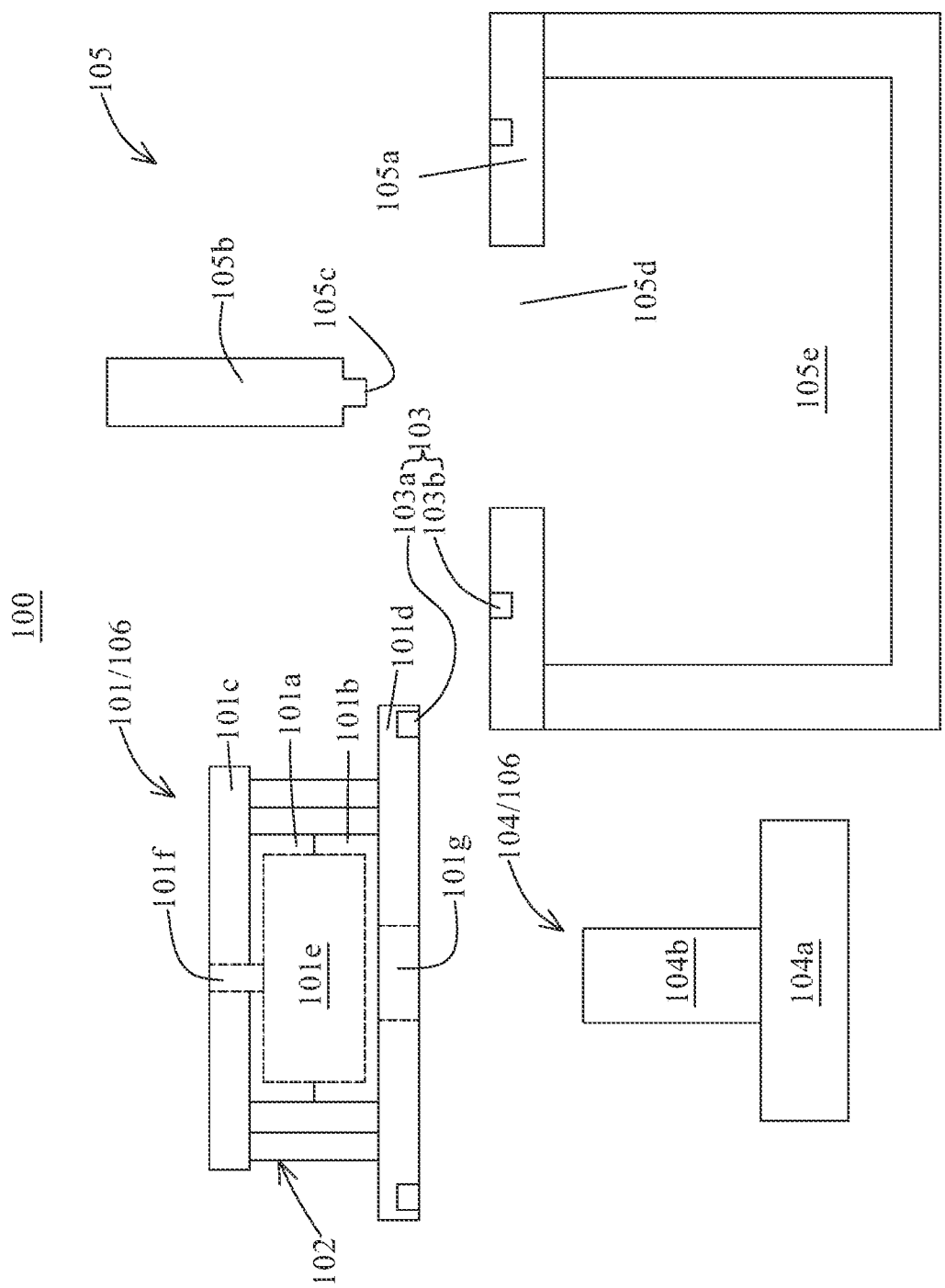
FIG. 1 is schematic cross-sectional view illustrating an injection molding system according to one embodiment of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the term "about." Accordingly, unless indicated to the contrary, the numerical parameters set forth in the present disclosure and the attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a schematic cross-sectional view illustrating an injection molding system 100. In some embodiments, the injection molding system 100 includes a molding device 101, a plunger 104 and an injection station 105. In some embodiments, the injection station 105 is configured to receive the molding device 101. The platform 105a is configured to dispose the molding device 101. The injector 105b is configured to discharge a fluid or liquid from an outlet 105c. In some embodiments, a first opening 105d extending through the platform 105a is included. In some embodiments, the injector 105b is disposed above the first opening 105d. In some embodiments, the injector 105b is overlapped with the first opening 105d from a top view. In some embodiments, the injection station 105 further includes a chamber 105e. The platform 105a and the injector 105b are disposed above the chamber 105e. The molding device 101 is disposed in the injection station 105.

In some embodiments, the molding device 101 is provided or received as shown in FIG. 1. In some embodiments, the molding device 101 includes a mold cavity 101e and a clamping unit 102 for clamping the molding device 101. In some embodiments, the molding device 101 is configured for forming an article in the mold cavity 101e, such as a formed article. In some embodiments, the fluid or liquid is injected into the mold cavity 101e and then the article is formed in the mold cavity 101e after a period of time.

In some embodiments, the mold cavity 101e is defined by a first mold base 101d and a second mold base 101c disposed over and corresponding to the first mold base 101d. In some embodiments, the molding device 101 further includes a first mold 101b disposed in the first mold base 101d and a second mold 101a disposed over and corresponding to the first mold 101b. In some embodiments, the second mold 101a corresponds to the first mold 101b in some configurations such as dimension, shape or the like. The second mold 101a can be placed on and engaged with the first mold 101b. In some embodiments, the mold cavity 101e is defined by the second mold 101a and the first mold 101b. In some embodiments, the second mold base 101c corresponds to the first mold base 101d in some configurations such as dimension, shape or the like. The second mold base 101c can be placed above the first mold base 101d.

In some embodiments, the molding device 101 further includes a first passage 101f extending through the second mold 101a and the second mold base 101c. The first passage 101f is configured to allow the fluid or liquid flowing through. In some embodiments, the first passage 101f is communicable with the mold cavity 101e.

In some embodiments, the first mold base 101d further includes a second opening 101g configured to receive at least a portion of the plunger 104. In some embodiments, the second opening 101g is overlapped with the first opening 105d from a top view. In some embodiments, the fluid or liquid is forced and pushed into the mold cavity 101e through the outlet 105c by an injecting force. In some embodiments, a direction of the injecting force is from the injector 105b towards the second opening 101g.

In some embodiments, the clamping unit 102 is disposed between the first mold base 101d and the second mold base 101c. In some embodiments, the second mold base 101c is coupled with the first mold base 101d by the clamping unit 102. In some embodiments, the clamping unit 102 is adjacent to the first mold 101b and the second mold 101a. In some embodiments, the molding device 101 includes a plurality of clamping units 102. In some embodiments, the clamping unit 102 is configured to apply a clamping force to the second mold 101a and the first mold 101b. The clamping force can be applied on the second mold base 101c towards the first mold base 101d or vice versa.

In some embodiments, the second mold 101a and the first mold 101b can maintain engagement with each other by the clamping force provided by the clamping unit 102. In other words, the molding device 101 can maintain in a closed configuration as shown in FIG. 1 by the clamping force from the clamping unit 102. In some embodiments, the clamping force can be applied continuously throughout an injection molding process. In some embodiments, the clamping force is in a range of about 5 Newton (N) to 15N. In some embodiments, the clamping force is about 10N.

In some embodiments, a gas is initially injected into the mold cavity 101e, and the clamping force is applied to the molding device 101 by the clamping unit 102 in order to maintain the mold cavity 101e at a predetermined pressure. In some embodiments, the molding device 101 is maintained in the closed configuration by the clamping force from the clamping unit 102 throughout the injection molding process.

In some embodiments, the fluid or liquid discharged from the outlet 105c includes a polymeric material. In some embodiments, the polymeric material is flowable along the injector 105b and dischargeable from the outlet 105c. In some embodiments, the fluid or liquid includes a mixture of the polymeric material and a blowing agent. In some embodiments, the flowable polymeric material is formed by hot-melting or any other suitable processes. The technical details of hot-melting are known in the prior art, and description thereof is omitted herein.

In some embodiments, the polymeric material includes ethylene vinyl acetate (EVA), styrene-ethylene-butylene-styrene (SEBS), thermoplastic polyurethanes (TPU), thermoplastic polyester elastomer (TPEE) or the like. In some embodiments, the blowing agent can be any type of chemical or physical blowing agent known to those of ordinary skill in the art. In some embodiments, the blowing agent is a supercritical fluid. The supercritical fluid may include inert gas such as carbon dioxide or nitrogen in supercritical state. The technical details of mixing the polymeric material and the blowing agent are known in the prior art, and description thereof is omitted herein.

In some embodiments, the molding device 101 further includes a locking device 103. In some embodiments, the locking device 103 is configured to lock the molding device 101 on the platform 105a. In some embodiments, the locking device 103 is configured to facilitate a temporarily engagement of the molding device 101 to the injection station 105. In some embodiments, the locking device 103 is used to prevent movement of the molding devices 101 during the injection of the fluid or the liquid into the mold cavity 101e. The locking device 103 can be disposed at any suitable position.

In some embodiments, the locking device 103 includes a first locking element 103a disposed on the molding device 101 and a second locking element 103b disposed on the platform 105a and corresponding to the first locking element 103a. In some embodiments, the first locking element 103a is disposed on the first mold base 101d. In some embodiments, the first and second locking elements 103a, 103b can be clamped to or engage with each other, but the disclosure is not limited thereto. In some embodiments, the first locking element 103a is overlapped with the second locking element 103b when the first and second locking elements 103a, 103b are clamped to or engage with each other.

In some embodiments, the first locking element 103a is a part of the molding device 101, while the second locking element 103b is a part of the platform 105a. In some embodiments, the first locking element 103a and the second locking element 103b are configured complementary with each other. In some embodiments, the first locking element 103a protrudes from the molding device 101, and the second locking element 103b is configured to receive the first locking element 103a. In some embodiments, the second locking element 103b protrudes from the platform 105a, and the first locking element 103a is configured to receive the second locking element 103b. The position and number of the first locking element 103a may be adjusted according to requirements, and are not particularly limited. The position and number of the second locking element 103b may also be adjusted according to requirements, and are not particularly limited. In some embodiments, the position and number of the second locking element 103b correspond to the position and number of the first locking element 103a.

In some embodiments, the plunger 104 includes a base 104a and a rod 104b. The plunger 104 is configured to provide a plunging force. In some embodiments, the plunger 104 is a hydraulic plunger. In some embodiments, the rod 104b is extendable and retractable. In some embodiments, the rod 104b is movable vertically. In some embodiments, the plunger can provide the plunging force in a range of about 30N to 80N. In some embodiments, the plunging force is about 50N.

In some embodiments, the plunger 104 is movable relative to the injection station 105. In some embodiments, the plunger 104 is separated from the injection station 105, and may be moved into the injection station 105. In some embodiments, the plunger 104 is not movable and is initially fixed in the injection station 105. In some embodiments, the plunger 104 is fixedly disposed under the platform 105a, and the rod 104b is vertically aligned with the first opening 105d. In some embodiments, the plunger 104 is initially fixed in the chamber 105e.

Figure 2:
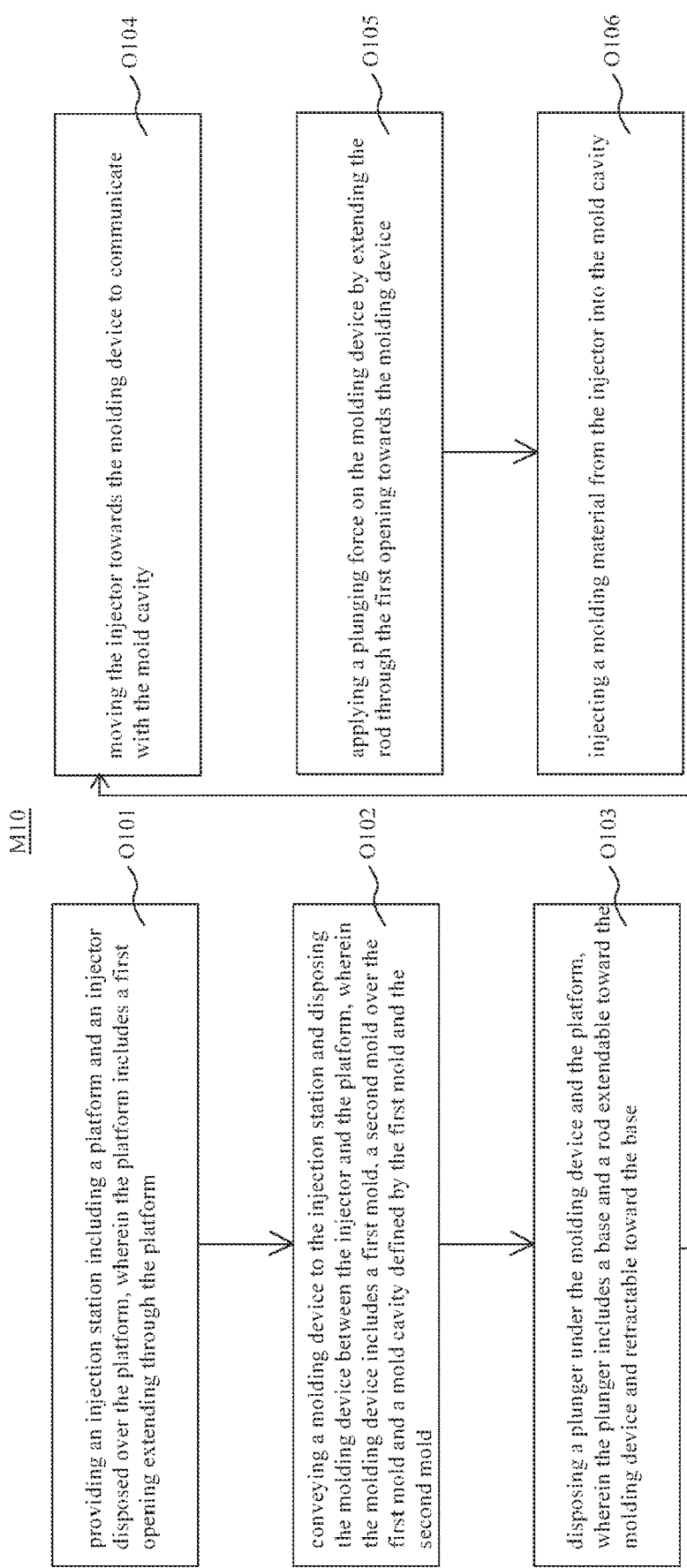
FIG. 2 is a flowchart illustrating an injection molding method according to one embodiment of the present invention.

FIG. 2 is a flowchart showing a method M10 of injection molding method in accordance with some embodiments of the present disclosure. The method M10 includes several operations: (O101) providing an injection station including a platform and an injector disposed over the platform, wherein the platform includes a first opening extending through the platform; (O102) conveying a molding device to the injection station and disposing the molding device between the injector and the platform, wherein the molding device includes a first mold, a second mold over the first mold and a mold cavity defined by the first mold and the second mold; (O103) disposing a plunger under the molding device and the platform, wherein the plunger includes a base and a rod extendable toward the molding device and retractable toward the base; (O104) moving the injector towards the molding device to communicate with the mold cavity; (O105) applying a plunging force on the molding device by extending the rod through the first opening towards the molding device; and (O106) injecting a molding material from the injector into the mold cavity.

In order to illustrate concepts and the method M10 of the present disclosure, various embodiments are provided below. However, the present disclosure is not intended to be limited to specific embodiments. In addition, elements, conditions or parameters illustrated in different embodiments can be combined or modified to form different combinations of embodiments as long as the elements, parameters or conditions used are not in conflict. For ease of illustration, reference numerals with similar or same functions and properties are repeated in different embodiments and figures. The various operations and the thus formed articles of the injection molding method can be in various configurations. In some embodiments, the method M10 is implemented by the injection molding system 100 as shown in FIG. 1, and FIGS. 3-8 are schematic cross-sectional views of various stages of the injection molding method.

Figure 3:
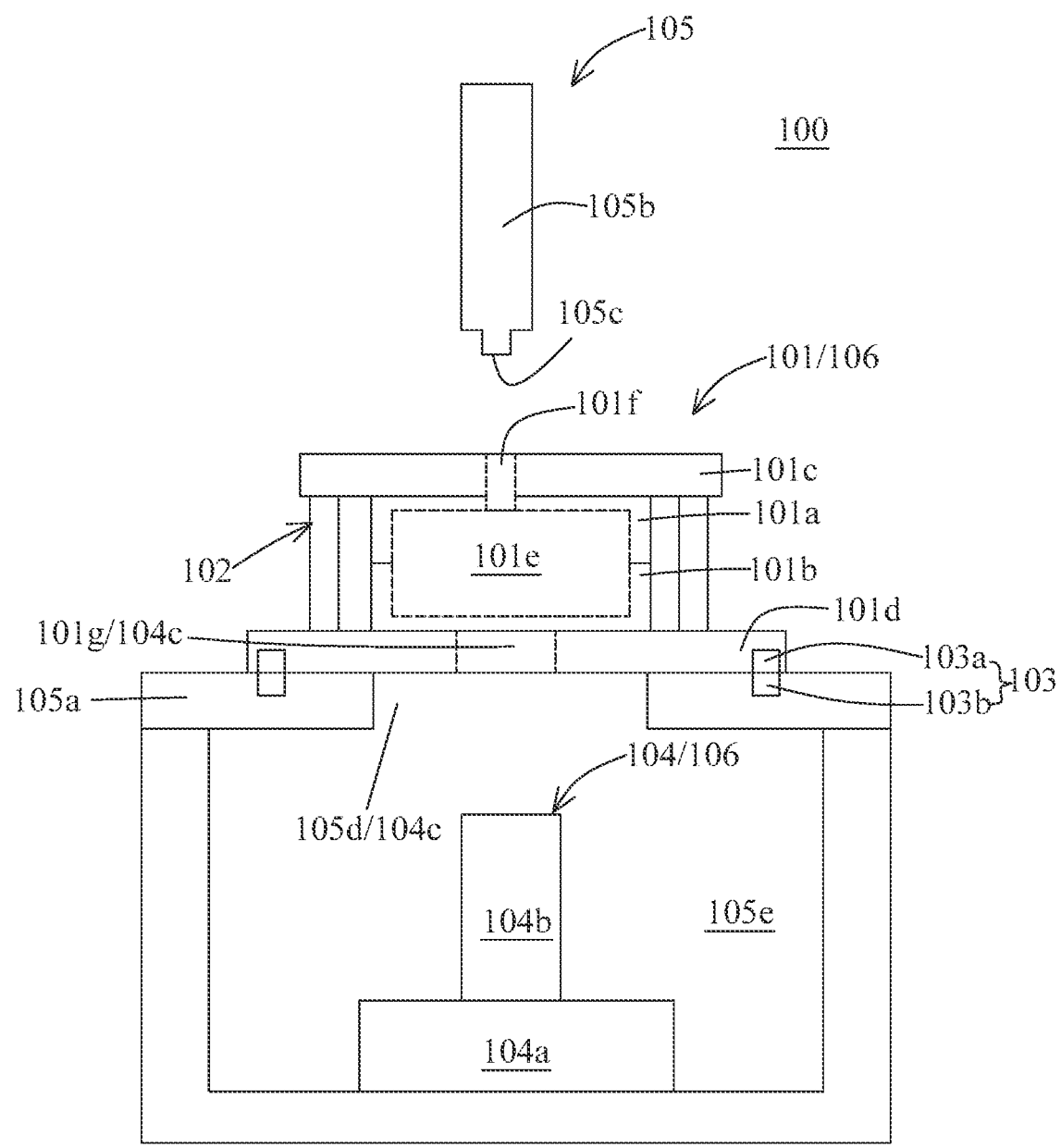
FIGS. 3-7 are schematic cross-sectional views illustrating exemplary operations in an injection molding method according to one embodiment of the present disclosure.

In some embodiments, the method M10 of injection molding method includes operation O101, which includes providing the injection station 105 as shown in FIG. 3. The injection station 105 includes a platform 105a and an injector 105b disposed over the platform 105a. In some embodiments, the platform 105a includes a first opening 105d extending through the platform 105a.

In some embodiments, the method M10 of injection molding method includes operation O102, which includes conveying the molding device 101 to the injection station 105 and disposing the molding device 101 between the injector 105b and the platform 105a as shown in FIG. 3. In some embodiments, the molding device 101 is disposed in the injection station 105. In some embodiments, the molding device 101 at least includes the first mold 101b, the second mold 101a over the first mold 101b and the mold cavity 101e defined by the first mold 101b and the second mold 101a.

The molding device 101 is moved towards the injection station 105 and placed on the platform 105a as shown in FIG. 3. During the movement of the molding device 101, the molding device 101 is maintained in the closed configuration by the clamping unit 102. In some embodiments, the mold cavity 101e is maintained at the predetermined pressure during the movement of the molding device 101. In some embodiments, the second mold 101a and the first mold 101b can maintain engagement with each other by the clamping force provided by the clamping unit 102. In some embodiments, the clamping force can be applied continuously throughout an injection molding process. In some embodiments, the clamping force is in a range of about 5 Newton (N) to 15N. In some embodiments, the clamping force is about 10N.

In some embodiments, the molding device 101 is engaged with the platform 105a. In some embodiments, the first locking element 103a is vertically aligned with the second locking element 103b. In some embodiments, the second opening 101g is overlapped with the first opening 105d from a top view.

In some embodiments, the outlet 105c of the injector 105b is disposed above the first passage 101f of the molding device 101. In some embodiments, a second passage 104c including the first opening 105d and the second opening 101g is formed after placing the molding device 101 on the platform 105a. In some embodiments, the second passage 104c extends through the platform 105a and the first mold base 101d. In some embodiments, the first passage 101f is overlapped with the second passage 104c from a top view. In some embodiments, the injector 105b may be extended into and be retracted from the molding device 101. In some embodiments, the injector 105b and the outlet 105c are overlapped with the first passage 101f from a top view.

In some embodiments, the method M10 of injection molding method includes operation O103, which includes disposing the plunger 104 under the molding device 101 and the platform 105a. In some embodiments, the plunger 104 includes a base 104a and a rod 104b extendable toward the molding device 101 and retractable toward the base 104a. In some embodiments, the method M10 further includes aligning the injector 105b with the rod 104b before and during injecting the fluid or the liquid.

The plunger 104 is moved towards the injection station 105 and placed under the platform 105a as shown in FIG. 3. In some embodiments, the plunger 104 is disposed in the injection station 105 and under the molding device 101. In some embodiments, the plunger 104 is in the retracted configuration during the movement. In some embodiments, the plunger 104 is fixedly disposed under the molding device 101 and the first opening 105d. In some embodiments, the rod 104b of the plunger 104 is aligned with the second passage 104c after movement. In some embodiments, the plunger 104 is in a retracted configuration as shown in FIG. 3. In some embodiments, the plunger 104 is disposed in the injection station 105 and under the molding device 101. In some embodiments, the plunger 104 is disposed under the platform 105a. In some embodiments, the plunger 104 is disposed in the chamber 105e. In some embodiments, the rod 104b is vertically aligned with the first opening 105d. In some embodiments, the rod 104b is extendable through the first opening 105d. In some embodiments, the rod 104b is extended and at least a portion of the rod 104b is disposed in the second opening 101g. In some embodiments, the rod 104b is vertically aligned with the injector 105b and the outlet 105c.

In some embodiments, the molding device 101 and the plunger 104 are conveyed into the injection station 105 simultaneously. In some embodiments, the molding device 101 and the plunger 104 are configured as a molding module 106. In some embodiments, the molding device 101 and the plunger 104 are moved together into the injection station 105. In some embodiments, the molding device 101 is disposed above and aligned with the plunger 104 before moving into the injection station 105 as shown in FIG. 1. The second opening 101g of the first mold base 101d is vertically aligned with the rod 104b of the plunger 104.

Figure 4:
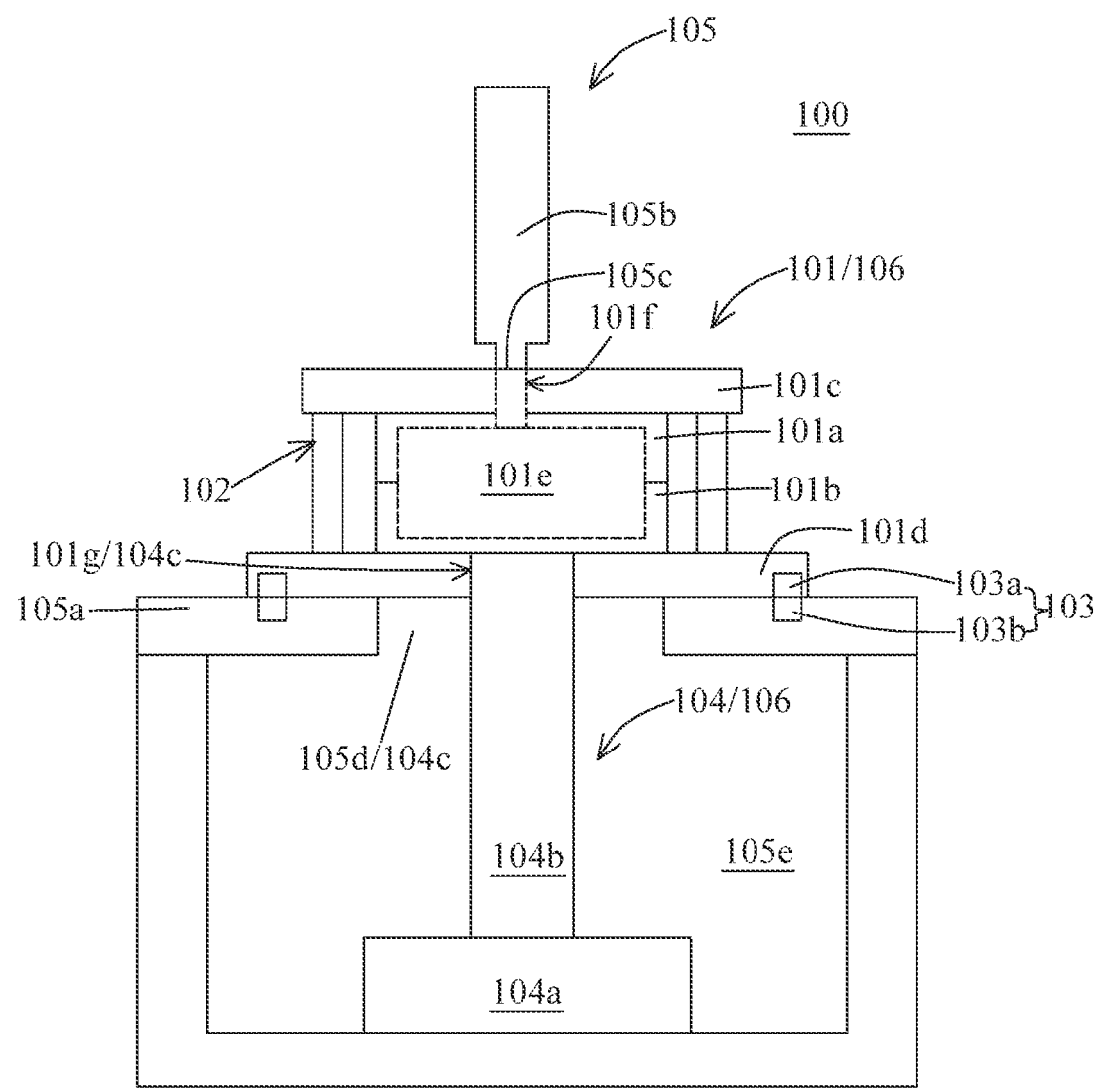

FIG. 4 is a schematic cross-sectional view illustrating the operations O104 and O105 of the method M10 in accordance with some embodiments of the present disclosure. In some embodiments, the method M10 of injection molding method includes operation O104, which includes moving the injector 105b towards the molding device 101 to communicate with the mold cavity 101e.

In some embodiments, the injector 105b is moved towards the molding device 101 after the engagement of the molding device 101 with the platform 105a. In some embodiments, the injector 105b is moved towards the molding device 101 after the engagement of the first locking element 103a and the second locking element 103b. In some embodiments, the outlet 105c of the injector 105b is engaged with the first passage 101f, such that the fluid or liquid can flow from the injector 105b into the mold cavity 101e through the first passage 101f.

In some embodiments, the method M10 of injection molding method includes operation O105, which includes applying a plunging force on the molding device 101 by extending the rod 104b through the first opening 105d towards the molding device 101. In some embodiments, the rod 104b extends towards the molding device 101 to provide the plunging force on the molding device 101. In some embodiments, the rod 104b extends and passes through the second passage 104c to contact the first mold 101b and press the first mold 101b towards the second mold 101a. The rod 104b contacts the molding device 101 during the application of the plunging force. The plunging force is applied on the first mold 101b towards the second mold 101a. In some embodiments, the upward plunging force is applied to the molding device 101. In some embodiments, the plunging force is in a range of about 30N to about 80N. In some embodiments, the plunging force is about 50N. The second mold 101a and the first mold 101b are tightly engaged with each other during the application of the plunging force. In some embodiments, the plunger 104 is in an extended configuration as shown in FIG. 4.

In some embodiments, the method M10 of injection molding method further includes locking the molding device 101 on the platform 105a before injection. Since the molding device 101 is engaged with the platform 105a by the locking device 103, a downward reaction force from the molding device 101 or the second mold base 101c opposing the upward plunging force is generated. As a result, the molding device 101 is under a higher pressure upon the application of the plunging force, compared with the molding device 101 maintained in the predetermined pressure (in the closed configuration) by the clamping unit 102. In some embodiments, the plunging force is provided prior to and/or during an injection of the fluid or liquid from the injector 105b into the mold cavity 101e.

Figure 5:
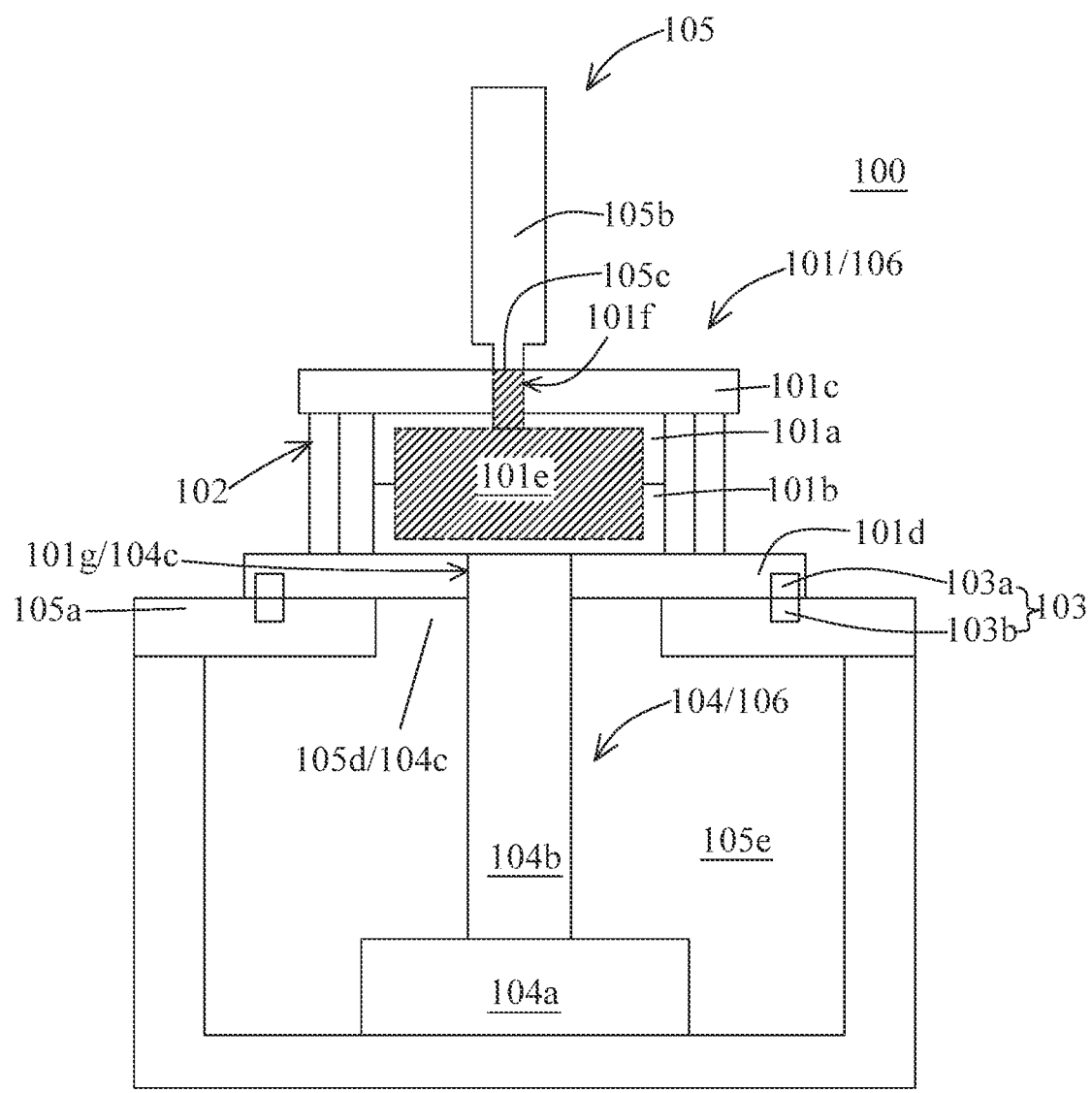

FIG. 5 is a schematic cross-sectional view illustrating the operation O106 of the method M10 in accordance with some embodiments of the present disclosure. In some embodiments, the method M10 of injection molding method includes operation O106, which includes injecting a molding material from the injector 105b into the mold cavity 101e. In some embodiments, the fluid or liquid includes the molding material.

The fluid or liquid is discharged and flowed from the injector 105*b* into the mold cavity 101*e* as shown in FIG. 5. In some embodiments, the fluid or liquid forms an article within the mold cavity 101*e*. During the discharge of the fluid or liquid from the injector 105*b* into the mold cavity 101*e*, the plunger 104 keeps applying the plunging force on the molding device 101, so that the second mold 101*a* keeps engaging with the first mold 101*b* and the outlet 105*c* keeps engaging with the first passage 101*f*. In some embodiments, the clamping force is applied to clamp the first mold 101*b* and the second mold 101*a* during the conveying of the molding device 101 and the injection of the fluid or liquid. During the discharge of the fluid or liquid from the injector 105*b* into the mold cavity 101*e*, the injector 105*b* and the outlet 105*c* are overlapped with the first passage 101*f*, the second passage 104*c* and the rod 104*b* from a top view.

Figure 6:
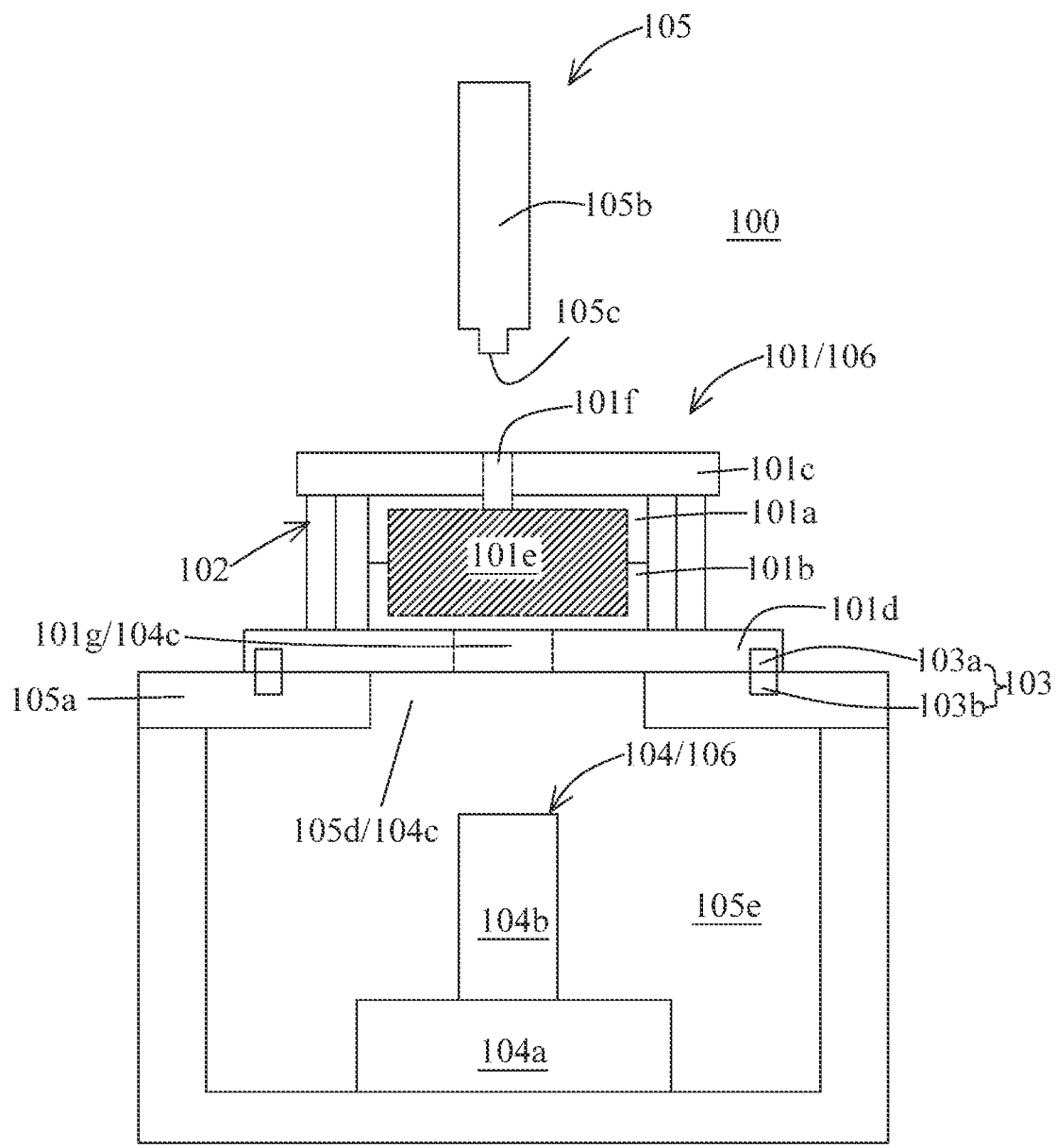

FIG. 6 is a schematic cross-sectional view illustrating the operation of the method M10 in accordance with some embodiments of the present disclosure. In some embodiments, when the injection of the fluid or liquid into the mold cavity 101*e* is accomplished, the injector 105*b* is withdrawn and moved away from the molding device 101 as shown in FIG. 6. In some embodiments, when the injection of the fluid or liquid into the mold cavity 101*e* is accomplished, the rod 104*b* is retracted towards the base 104*a* and the plunging force is withdrawn by retracting the rod 104*b*. The outlet 105*c* is disengaged from the first passage 101*f*, and the rod 104*b* is moved away from the molding device 101. After the withdrawn of the plunging force, the molding device 101 is continuously maintained in the closed configuration and under the predetermined pressure.

Figure 7:
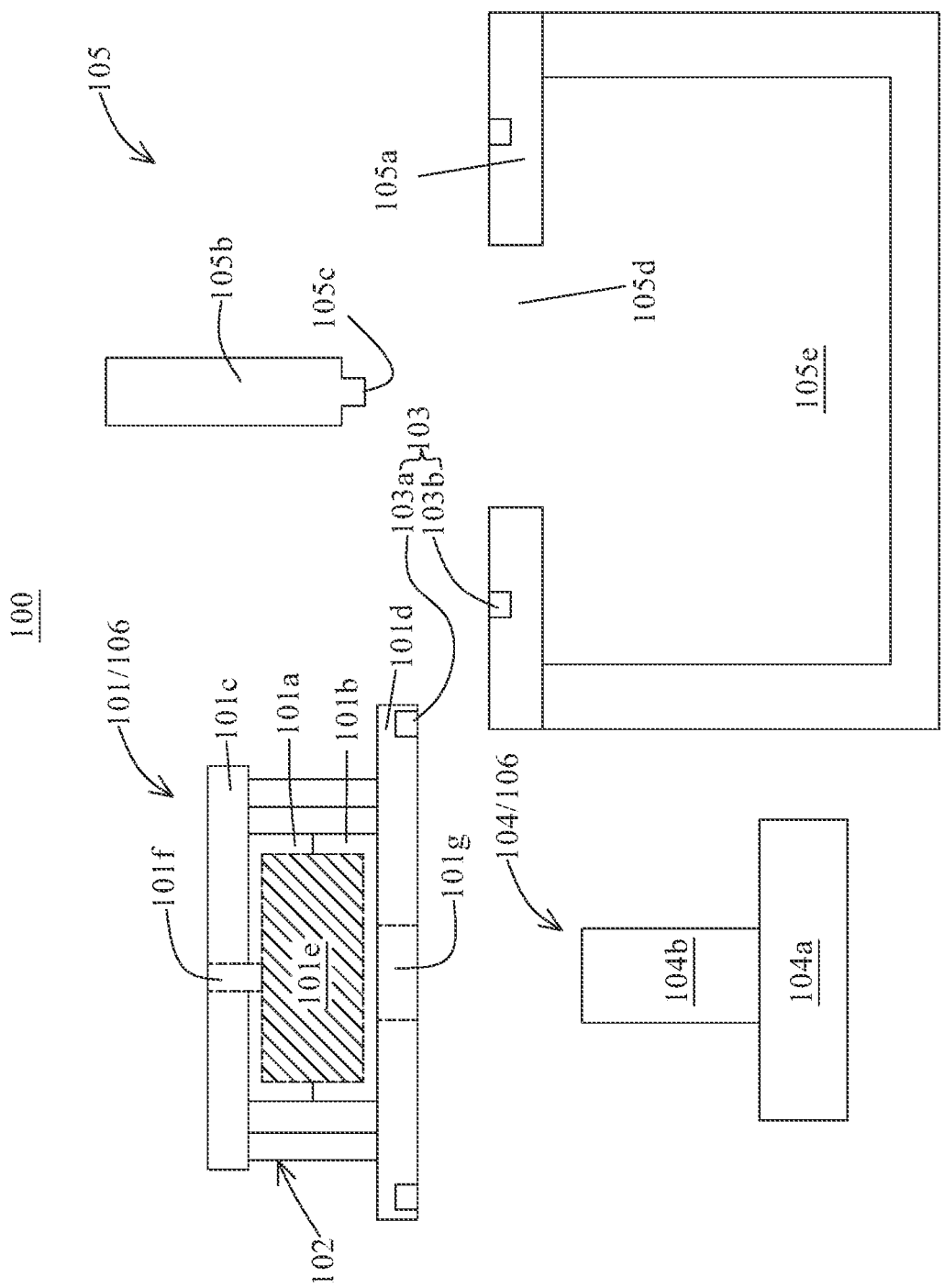

FIG. 7 is a schematic cross-sectional view illustrating the operations of the method M10 in accordance with some embodiments of the present disclosure. In some embodiments, as shown in FIG. 7, the method M10 of injection molding method further includes conveying the molding device 101 away from the injection station 105 after the withdrawal of the injector 105*b* and the retraction of the rod 104*b*. In some embodiments, the method M10 further includes unlock the molding device 101 from the platform 105*a* after injection and before conveying the molding device 101 away. In some embodiments, the first locking element 103*a* and the second locking element 103*b* are disengaged from each other before moving the molding device 101 out of the injection station 105.

In some embodiments, the molding device 101 is moved away from the platform 105*a* by a conveying mechanism such as conveying belt, roller, etc. When the molding device 101 is moved out of the injection station 105, the molding device 101 is continuously maintained in the closed configuration and under the predetermined pressure. The clamping force is continuously applied to the molding device 101 by the clamping unit 102 during or after moving the molding device 101 out of the injection station 105.

In some embodiments, after the accomplishment of injecting the fluid or liquid from the injector 105*b* into the mold cavity 101*e*, the plunger 104 is moved away from the injection station 105 as shown in FIG. 7. In some embodiments, after the accomplishment of injecting the fluid or liquid from the injector 105*b* into the mold cavity 101*e*, the molding device 101 and the plunger 104 are conveyed out of the injection station 105 simultaneously. In some embodiments, after the accomplishment of injecting the fluid or liquid from the injector 105*b* into the mold cavity 101*e*, the molding module 106 is moved away from the injection station 105.

In some embodiments, the molding device 101 is moved out of the injection station 105 for cooling. The molding device 101 is cooled for a predetermined duration to form the article in the mold cavity 101*e*. In some embodiments, the molding device 101 opens after the formation of the article. The clamping unit 102 is released to open the molding device 101. The second mold 101*a* and the first mold 101*b* are moved away from each other, and then the article formed in the mold cavity 101*e* can be obtained.

As discussed above, the molding device 101 is required to maintain in the predetermined pressure throughout the injection molding process, except during the injection of the fluid or liquid from the injector 105*b* into the mold cavity 101*e*. The molding device 101 is required to be under a higher pressure only during the injection of the fluid or liquid from the injector 105*b* into the mold cavity 101*e*. In other words, it is not necessary to continuously maintain a high pressure or high force on the molding device 101 throughout the injection molding process. Therefore, lifespan of the molding device 101 can be improved or increased, energy consumed by the above injection molding system 100 or method can be lowered, and overall dimension or structural configuration of the molding device 101 can be more compact, lighter and simpler. Performance of the injection molding system or injection molding method can be more efficient and faster.

Figure 8:
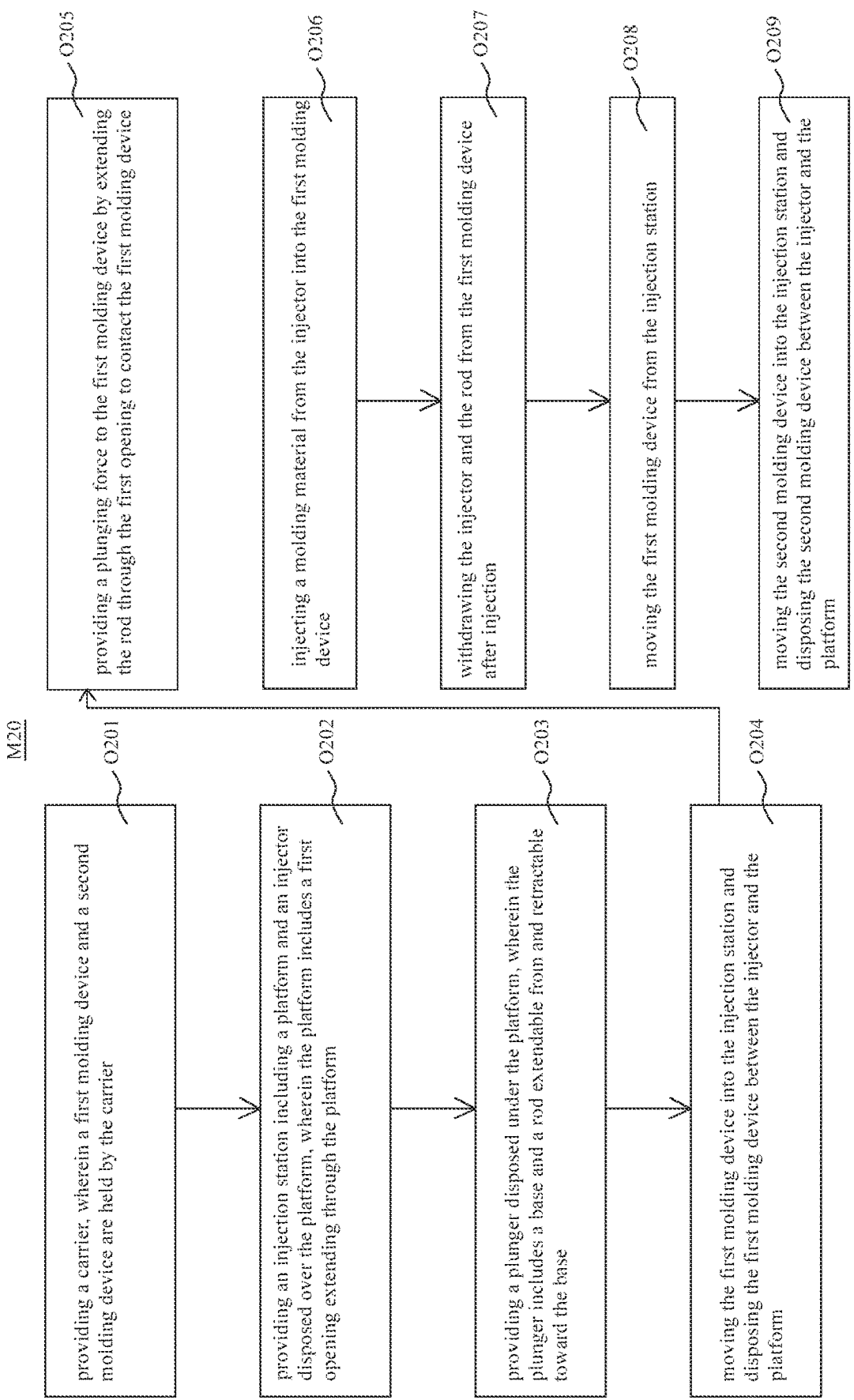
FIG. 8 is a flowchart illustrating an injection molding method according to one embodiment of the present invention.

FIG. 8 is a flowchart showing a method M20 of injection molding method in accordance with some embodiments of the present disclosure. The method M20 includes several operations: (O201) providing a carrier, wherein a first molding device and a second molding device are held by the carrier; (O202) providing an injection station including a platform and an injector disposed over the platform, wherein the platform includes a first opening extending through the platform; (O203) providing a plunger disposed under the platform, wherein the plunger includes a base and a rod extendable from and retractable toward the base; (O204) moving the first molding device into the injection station and disposing the first molding device between the injector and the platform; (O205) providing a plunging force to the first molding device by extending the rod through the first opening to contact the first molding device; (O206) injecting a molding material from the injector into the first molding device; (O207) withdrawing the injector and the rod from the first molding device after injection; (O208) moving the first molding device from the injection station; and (O209) moving the second molding device into the injection station and disposing the second molding device between the injector and the platform.

In order to illustrate concepts and the method M20 of the present disclosure, various embodiments are provided below. However, the present disclosure is not intended to be limited to specific embodiments. In addition, elements, conditions or parameters illustrated in different embodiments can be combined or modified to form different combinations of embodiments as long as the elements, parameters or conditions used are not in conflict. For ease of illustration, reference numerals with similar or same functions and properties are repeated in different embodiments and figures. The various stages of the injection molding method can be in various configurations as shown in any of FIGS. 9 to 22.

FIGS. 9 to 22 are schematic top views illustrating injection molding systems 200, 300. In some embodiments, the injection molding method M10 as described above or illustrated in FIGS. 1-7 is implemented by the injection molding system 200. In some embodiments, the injection molding method M20 is implemented by the injection molding system 200 or the injection molding system 300.

Figure 9:
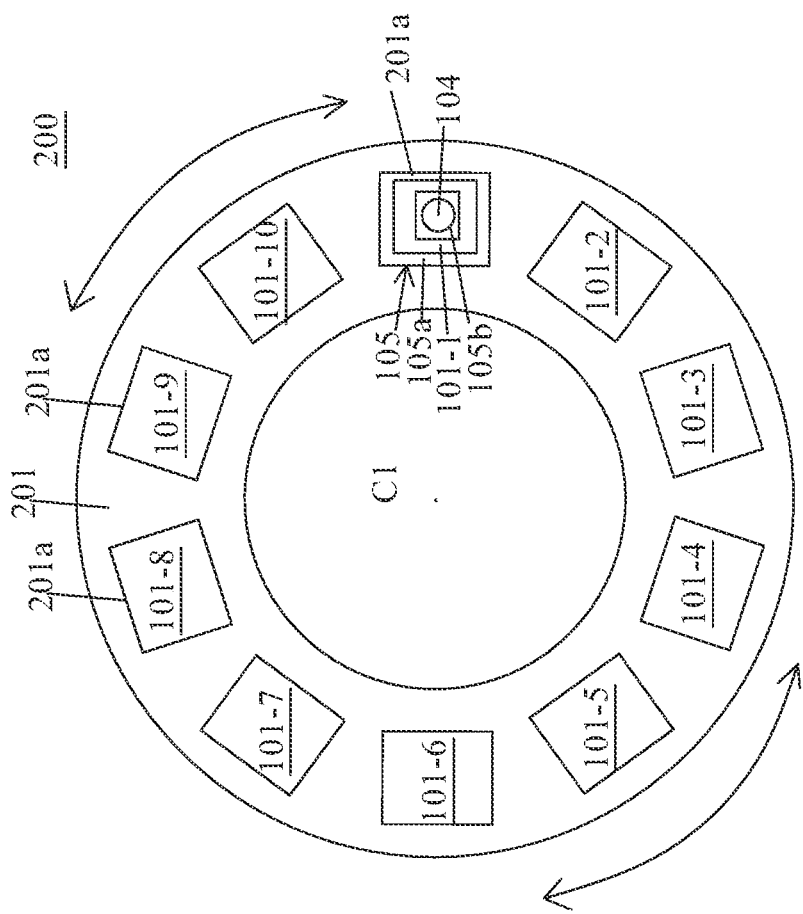
Figure 10:
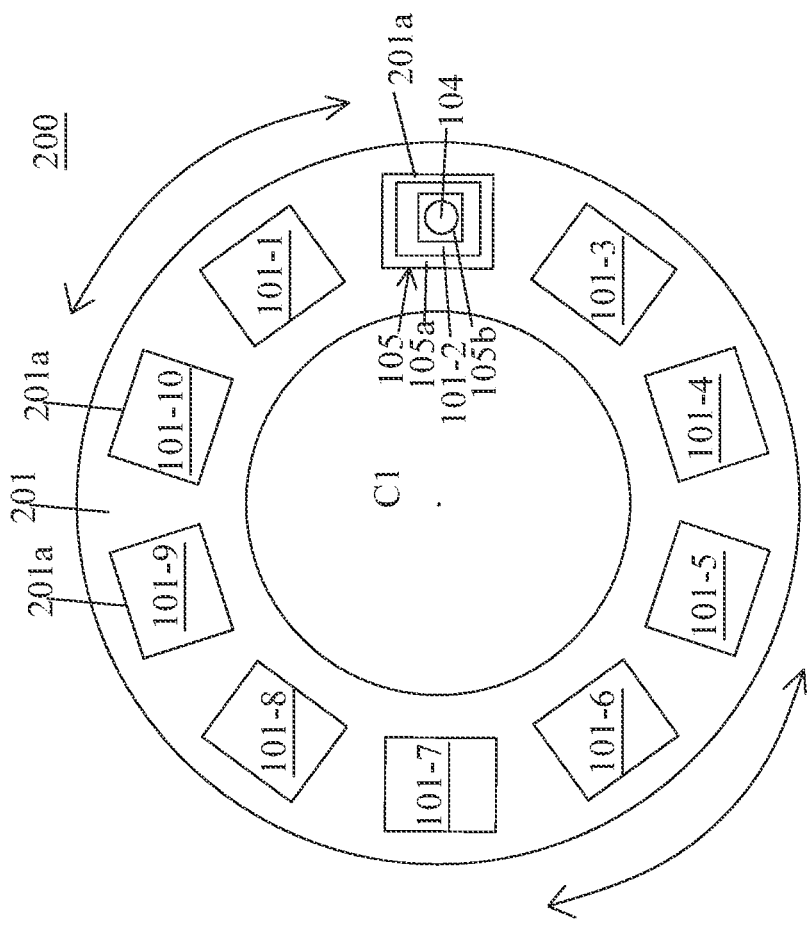

FIGS. 9 and 10 are schematic top views illustrating an injection molding system 200 of the method M20 in accordance with some embodiments of the present disclosure. Initially, in some embodiments, as shown in FIG. 9, the method M20 of injection molding method includes step O201, which includes providing a carrier 201, wherein a first molding device 101-1 and a second molding device 101-2 are held by the carrier 201. In some embodiments, the method M20 of injection molding method further includes step O202, which includes providing an injection station 105 including a platform 105a and an injector 105b disposed over the platform 105a, wherein the platform 105a includes a first opening 105d extending through the platform 105a. In some embodiments, the method M20 of injection molding method includes step O203, which includes providing a plunger 104 disposed under the platform 105a, wherein the plunger 104 includes a base 104a and a rod 104b extendable from and retractable toward the base 104a. In some embodiments, the method M20 of injection molding method includes step O204, which includes moving the first molding device 101-1 into the injection station 105 and disposing the first molding device 101-1 between the injector 105b and the platform 105a. In some embodiments, the method M20 of injection molding method includes step O205, which includes providing a plunging force to the first molding device 101-1 by extending the rod 104b through the first opening 105d to contact the first molding device 101-1. In some embodiments, the method M20 of injection molding method includes step O206, which includes injecting a molding material from the injector 105b into the first molding device 101-1. In some embodiments, the method M20 of injection molding method includes step O207, which includes withdrawing the injector 105b and the rod 104b from the first molding device 101-1 after injection.

In some embodiments, as shown in FIG. 9, an injection molding system such as the injection molding system 100 shown in FIGS. 1 and 3-7 is arranged in the rotatable carrier 201. In some embodiments, each of the first and second molding devices 101-1, 101-2 is in configuration similar to the molding device 101 described above or illustrated in FIGS. 1 and 3 to 7. In some embodiments, the injection station 105 is in configuration similar to the one described above or illustrated in FIGS. 1 and 3 to 7. In some embodiments, the plunger 104 is in configuration similar to the one described above or illustrated in FIGS. 1 and 3 to 7.

In some embodiments, several molding devices 101-1, 101-2, 101-3, 101-4, 101-5, 101-6, 101-7, 101-8, 101-9, 101-10 are arranged on the carrier 201. In some embodiments, the carrier 201 includes several holders 201a for holding molding devices 101-1, 101-2, 101-3, 101-4, 101-5, 101-6, 101-7, 101-8, 101-9, 101-10 or a part of the molding devices 101-1, 101-2, 101-3, 101-4, 101-5, 101-6, 101-7, 101-8, 101-9, 101-10. It is readily understood that the carrier 201 can include any suitable number of holders 201a. In some embodiments, each of the holders 201a can hold the corresponding molding devices 101-1, 101-2, 101-3, 101-4, 101-5, 101-6, 101-7, 101-8, 101-9, 101-10. For example as shown in FIG. 9, the first and second molding devices 101-1, 101-2 are held by two holders 201a respectively. In some embodiments, the number of the holders 201a is more than or equal to the number of the molding devices 101-1, 101-2, 101-3, 101-4, 101-5, 101-6, 101-7, 101-8, 101-9, 101-10.

The injection station 105 is disposed across the carrier 201 and several molding devices 101-1, 101-2, 101-3, 101-4, 101-5, 101-6, 101-7, 101-8, 101-9, 101-10 are arranged on the carrier 201. In some embodiments, a portion of the carrier 201 is disposed in the injection station 105.

In some embodiments, a portion of the carrier 201 is disposed between the platform 105a and the injector 105b. The molding devices 101-1, 101-2, 101-3, 101-4, 101-5, 101-6, 101-7, 101-8, 101-9, 101-10 are conveyed into the injection station 105 one by one by the rotation of the carrier 201. For example, the first molding devices 101-1 is moved and placed on the platform 105a of the injection station 105, and then the injection molding method M10 as described above or shown in FIGS. 1 and 3-7 is performed on the first molding device 101-1. In some embodiments, the first molding device 101-1 is moved into the injection station 105 by rotation of the carrier 201. In some embodiments, the carrier 201 is rotated in a suitable speed or by a suitable force, such that the vibration of the molding devices 101-1, 101-2, 101-3, 101-4, 101-5, 101-6, 101-7, 101-8, 101-9, 101-10 during the conveying is minimized or even prevented. In some embodiments, the carrier 201 is rotated in a predetermined interval, such as an angular distance between adjacent holders 201a. In some embodiments, the carrier 201 is rotatable about a center C1 of the carrier 201.

In some embodiments, the method M20 includes moving the plunger 104 to dispose under the carrier 201 and the injection station 105 while the carrier 201 is stationary, or moving the carrier 201 to dispose the plunger 104 under the carrier 201 while the plunger 104 is stationary. In some embodiments, the plunger 104 is moved into the injection station 105 and disposed under the platform 105a before or after the placement of the first molding devices 101-1 on the platform 105a. In some embodiments, the injection station 105 and the plunger 104 are movable, and the carrier 201 is stationary. In some embodiments, the plunger 104 is fixedly disposed under the carrier 201 before the placement of the first molding devices 101-1 on the platform 105a. In some embodiments, the plunger 104 is fixedly disposed in the injection station 105 before the placement of the first molding devices 101-1 on the platform 105a. In some embodiments, the platform 105a is fixedly disposed under the carrier 201, and the injector 105b is fixedly disposed over the carrier 201 and overlapped with the first opening 105d from a top view. The carrier 201 is movable relative to the injection station 105, and the injection station 105 is stationary relative to the carrier 201.

In some embodiments, as shown in FIG. 10, the method M20 of injection molding method includes step O208, which includes moving the first molding device 101-1 from the injection station 105. Further, the method M20 of injection molding method includes step O209, which includes moving the second molding device 101-2 into the injection station 105 and disposing the second molding device 101-2 between the injector 105b and the platform 105a.

After the accomplishment of the injection molding method M10, in some embodiments, the first molding device 101-1 inside the injection station 105 is moved out of the injection station 105 by the rotation of the carrier 201. Simultaneously, the second molding device 101-2 adjacent to the first molding device 101-1 is moved into the injection station 105. The injection molding method M10 as described above or shown in FIGS. 1 and 3-7 is performed for the second molding device 101-2.

In some embodiments, the carrier 201 is in an annular shape. In some embodiments, the carrier 201 is turntable. In some embodiments, the carrier 201 can be rotated clockwisely or anti-clockwisely.

FIGS. 11 and 12 are schematic top views illustrating an injection molding system 300 of the method M20 in accordance with some embodiments of the present disclosure. In some embodiments, as shown in FIGS. 11 and 12, the injection molding system 300 includes a conveying belt 202, and several molding devices 101-1, 101-2, 101-3, 101-4, 101-5 are carried by the conveying belt 202. In some embodiments, the injection station 105 is disposed across a portion of the conveying belt 202 and the molding devices 101-1, 101-2, 101-3, 101-4, 101-5 are arranged on the conveying belt 202. In some embodiments, a portion of the conveying belt 202 is disposed between the platform 105*a* and the injector 105*b*. In some embodiments, one of the molding devices 101-1, 101-2, 101-3, 101-4, 101-5 is disposed between the platform 105*a* and the injector 105*b*.

In some embodiments, as shown in FIG. 11, an injection molding system such as the injection molding system 100 shown in FIGS. 1 and 3-7 is arranged in the conveying belt 202. In some embodiments, each of the first and second molding devices 101-1, 101-2 is in configuration similar to the molding device 101 described above or illustrated in FIGS. 1 and 3 to 7. In some embodiments, the injection station 105 is in configuration similar to the one described above or illustrated in FIGS. 1 and 3 to 7. In some embodiments, the plunger 104 is in configuration similar to the one described above or illustrated in FIGS. 1 and 3 to 7.

The molding devices 101-1, 101-2, 101-3, 101-4, 101-5 are conveyed into the injection station 105 one by one by the movement of the conveying belt 202. For example, the first molding device 101-1 is moved and placed on the platform 105*a* of the injection station 105, and then the injection molding method M10 as described above or shown in FIGS. 2-7 is performed. In some embodiments, the plunger 104 is moved into the injection station 105 and disposed under the platform 105*a* before or after the placement of the first molding device 101-1 on the platform 105*a*.

In some embodiments, the conveying belt 202 includes several holders 202*a* for holding a molding device or a part of the molding device. It is readily understood that the conveying belt 202 can include any suitable number of holders 202*a*. In some embodiments, each of the holders 202*a* can hold the corresponding molding devices 101. For example as shown in FIG. 11, the first and second molding devices 101-1, 101-2 are held by two holders 202*a* respectively. In some embodiments, the number of the holders 202*a* is more than or equal to the number of the molding devices 101.

After the accomplishment of the injection molding method M10, as shown in FIG. 12, the first molding device 101-1 inside the injection station 105 is moved out of the injection station 105 by the movement of the conveying belt 202. Simultaneously, another molding device 101 such as the second molding device 101-2 is moved into the injection station 105. The injection molding method M10 as described above or shown in FIGS. 2-7 is performed for the second molding device 101-2. In some embodiments, the conveying belt 202 is in a linear shape.

Figure 13:
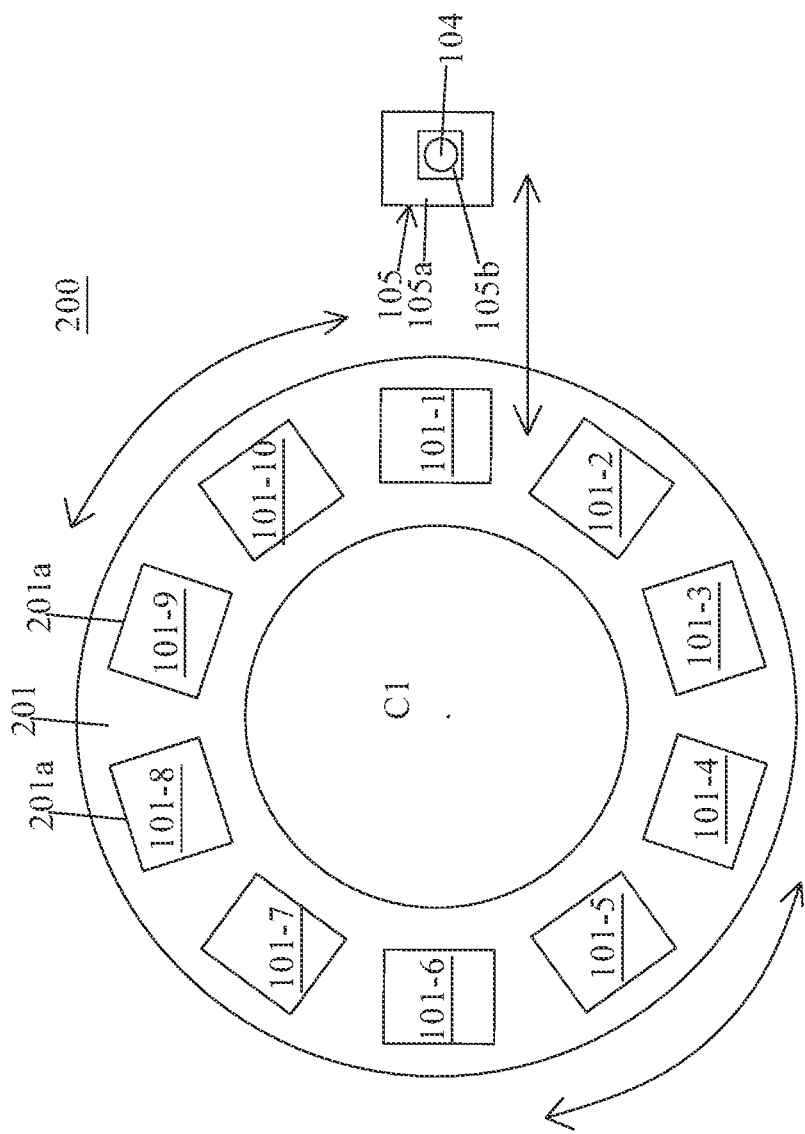
Figure 14:
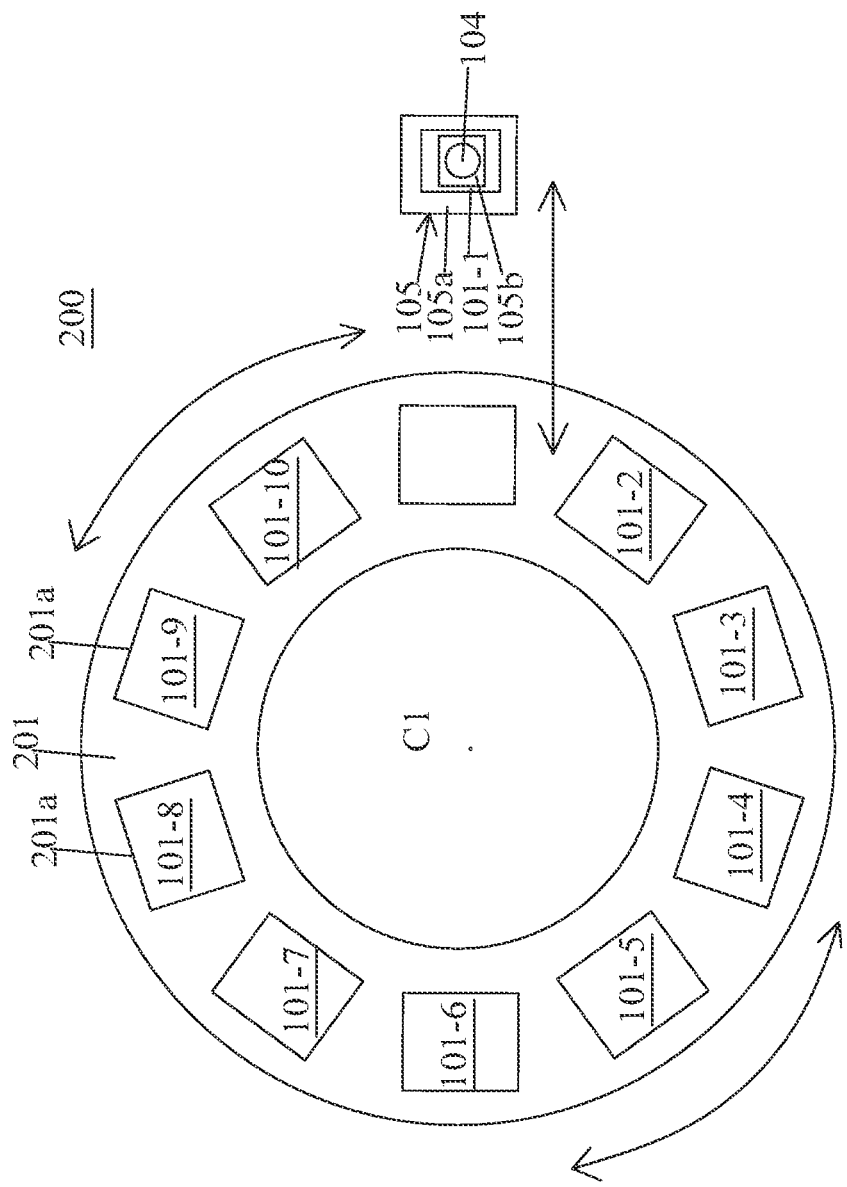

FIGS. 13 and 14 are schematic top views illustrating the injection molding system 200 of the method M20 in accordance with some embodiments of the present disclosure. In some embodiments, as shown in FIGS. 13 and 14, the injection station 105 is arranged outside the carrier 201. In some embodiments, the plunger 104 is arranged outside the carrier 201 and overlapped with the injector 105*b* from a top view. In some embodiments, as shown in FIG. 13, the carrier 201 rotates and moves the first molding device 101-1 to a position adjacent to the injection station 105 and the plunger 104. In some embodiments, as shown in FIG. 14, the first molding device 101-1 is then conveyed from the carrier 201 to the injection station 105 by a conveying mechanism such as rollers, conveying belts or the like.

After the conveying of the first molding device 101-1 from the carrier 201 to the injection station 105, the first molding device 101-1, the plunger 104 and the injection station 105 is in configuration similar to the injection molding system 100 as described above or illustrated in FIGS. 3-7. The first molding devices 101-1 is moved from the carrier 201 to the injection station 105, and then placed on the platform 105*a* of the injection station 105, and then the injection molding method M10 as described above or shown in FIGS. 2-7 is performed for the first molding device 101-1. After the accomplishment of the injection molding method M10, the first molding device 101-1 is moved out of the injection station 105 and conveyed back to the carrier 201 as shown in FIG. 13.

After the first molding device 101-1 is conveyed back to the carrier 201, the first molding device 101-1 is moved away from the injection station 105 by the rotation of the carrier 201. Simultaneously, another molding device 101 such as the second molding device 101-2 is moved toward the injection station 105 by the rotation of the carrier 201.

FIGS. 15 and 16 are schematic top views illustrating the injection molding systems 300 of the method M20 in accordance with some embodiments of the present disclosure. In some embodiments as shown in FIGS. 15 and 16, the injection station 105 is arranged outside the conveying belt 202. In some embodiments, the plunger 104 is arranged outside the carrier 201 and overlapped with the injector 105*b* from a top view. In some embodiments as shown in FIG. 15, the conveying belt 202 conveys the first molding device 101-1 and moves the first molding device 101-1 to a position adjacent to the injection station 105 and the plunger 104. In some embodiments, as shown in FIG. 16, the first molding device 101-1 is conveyed from the conveying belt 202 to the injection station 105 by a conveying mechanism such as rollers, conveying belts or the like.

After the conveying of the first molding device 101-1 from the conveying belt 202 to the injection station 105, the first molding device 101-1, the plunger 104 and the injection station 105 is in configuration similar to the injection molding system 100 as described above or illustrated in FIGS. 1 and 3-7. The first molding device 101-1 is moved out from the conveying belt 202 and then placed on the platform 105*a* of the injection station 105, and then the injection molding method M10 as described above or shown in FIGS. 2-7 is performed to the first molding device 101-1. After the accomplishment of the injection molding method M10, the first molding device 101-1 is moved out of the injection station 105 and conveyed back to the conveying belt 202 as shown in FIG. 15.

After the first molding device 101-1 is conveyed back to the conveying belt 202, the first molding device 101-1 is moved away from the injection station 105 by the movement of the conveying belt 202. Simultaneously, another molding device 101 such as the second molding device 101-2 is moved toward the conveying belt 202 by the movement of the conveying belt 202. In some embodiments as shown in FIG. 15, the molding devices 101-1, 101-2, 101-3, 101-4 and 101-5 are linearly movable by the conveying belt 202.

FIGS. 17-18 are schematic top views illustrating the injection molding systems 200, 300 of the method M20 in accordance with some embodiments of the present disclosure. In some embodiments as shown in FIG. 17, each of the molding devices 101-1, 101-2, 101-3, 101-4, 101-5, 101-6, 101-7, 101-8, 101-9, 101-10 and the corresponding plunger 104 are configured as a molding module 106. In other words, the molding device 101 and the corresponding plunger 104 are moved together into the injection station 105. In some embodiments, the molding device 101 is disposed above and overlapped with the plunger 104 from a top view before moving into the injection station 105. In some embodiments, the second opening 101g of the first mold base 101d is overlapped with the rod 104b of the corresponding plunger 104 from a top view. In some embodiments, each of the plunger 104 is moved together with the corresponding molding devices 101-1, 101-2, 101-3, 101-4, 101-5, 101-6, 101-7, 101-8, 101-9, 101-10 by the rotation of the carrier 201.

In some embodiments, as shown in FIG. 17, the injection station 105 is disposed across the carrier 201, and several molding modules 106 are arranged in the carrier 201. In some embodiments, one of the molding modules 106 is disposed in the injection station 105. The molding modules 106 are conveyed into the injection station 105 one by one by the rotation of the carrier 201. For example, the first molding device 101-1 and the corresponding plunger 104 is moved and placed in the injection station 105, and then the injection molding method M10 as described above or shown in FIGS. 2-7 is performed to the molding module 106 including the first molding device 101-1.

Similarly, in some embodiments, as shown in FIG. 18, the injection station 105 is disposed across the conveying belt 202, and several molding modules 106 are arranged on the conveying belt 202. In some embodiments, one of the molding modules 106 is disposed in the injection station 105. The molding modules 106 are conveyed into the injection station 105 one by one by the movement of the conveying belt 202. For example, the first molding devices 101-1 and the corresponding plunger 104 is moved out from the conveying belt 202 and then placed on the platform 105a of the injection station 105, and then the injection molding method M10 as described above or shown in FIGS. 2-7 is performed for the molding module 106 including the first molding device 101-1.

Figure 19:
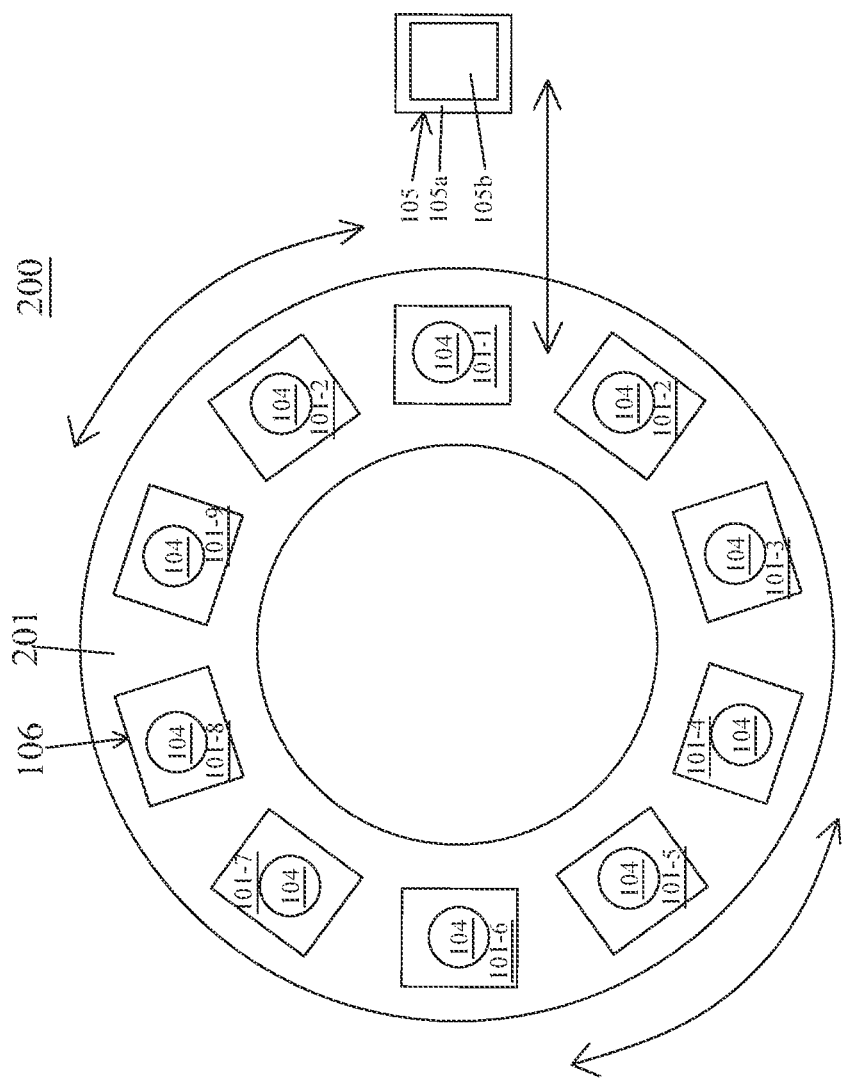
Figure 20:
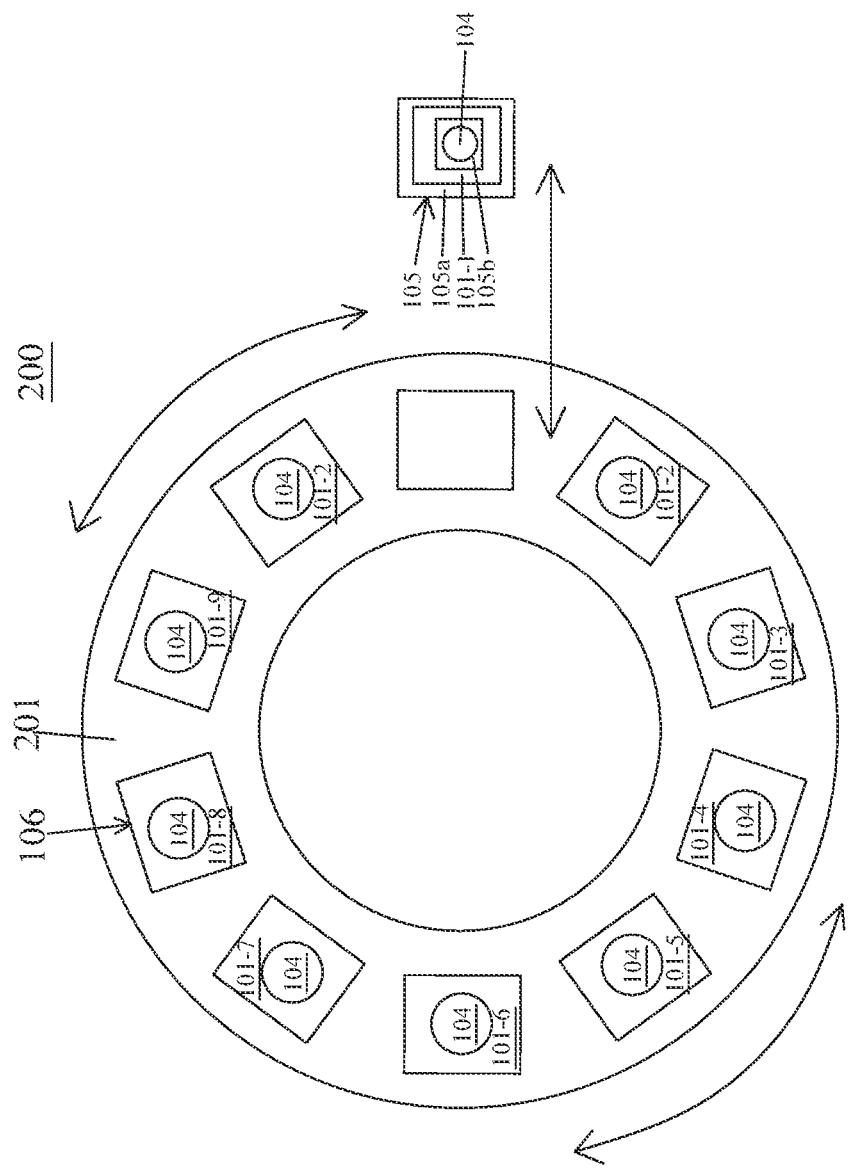

In some embodiments, as shown in FIGS. 19-20, the injection station 105 is arranged outside the carrier 201. In some embodiments, the carrier 201 rotates and moves the molding module 106 including the first molding device 101-1 to a position adjacent to the injection station 105. As shown in FIG. 20, the molding module 106 including the first molding device 101-1 is conveyed from the carrier 201 to the injection station 105 by a conveying mechanism such as rollers, conveying belts or the like. The molding module 106 including the first molding device 101-1 is moved out from the carrier 201, and then placed on the platform 105a of the injection station 105, and then the injection molding method M10 as described above or shown in FIGS. 2-7 is performed for the molding module 106 including the first molding device 101-1. After the accomplishment of the injection molding method M10, the molding module 106 including the first molding device 101-1 is moved out of the injection station 105 and conveyed back to the carrier 201, as shown in FIG. 19.

In some embodiments, as shown in FIGS. 21-22, the injection station 105 is arranged outside the conveying belt 202. In some embodiments, the conveying belt 202 moves the molding module 106 including the first molding device 101-1 to a position adjacent to the injection station 105. As shown in FIG. 22, the molding module 106 including the first molding device 101-1 is conveyed from the conveying belt 202 to the injection station 105 by a conveying mecha-nism such as rollers, conveying belts or the like. The molding module 106 including the first molding device 101-1 is moved out from the conveying belt 202, and then placed on the platform 105a of the injection station 105, and then the injection molding method M10 as described above or shown in FIGS. 2-7 is performed for the molding module 106 including the first molding device 101-1. After the accomplishment of the injection molding method M10, the molding module 106 including the first molding device 101-1 is moved out of the injection station 105 and conveyed back to the conveying belt 202, as shown in FIG. 21.

An aspect of this disclosure relates to an injection molding system includes an injection station, a molding device, and a plunger. The injection station includes a platform and an injector disposed over the platform, wherein the platform includes a first opening extending through the platform. The molding device is disposed between the platform and the injector and over the first opening, wherein the molding device includes a mold cavity and a clamping unit for clamping the molding device. The plunger disposed under the platform, wherein the plunger includes a base and a rod, the rod is extendable through the first opening toward the molding device and retractable toward the base.

In some embodiments, the plunger is movable relative to the injection station. In some embodiments, the rod is vertically aligned with the injector. In some embodiments, the mold cavity is defined by a first mold base and a second mold base disposed over and corresponding to the first mold base, wherein the molding device further includes a first mold disposed in the first mold base and a second mold disposed over and corresponding to the first mold. In some embodiments, the first mold base includes a second opening configured to receive at least a portion of the rod, and the second opening is overlapped with the first opening from a top view. In some embodiments, the rod is extendable through the second opening. In some embodiments, the injection molding system further includes a locking device configured to lock the molding device on the platform, wherein the locking device includes a first locking element disposed on the molding device and a second locking element disposed on the platform and corresponding to the first locking element.

An aspect of this disclosure relates to an injection molding method. The method includes providing an injection station including a platform and an injector disposed over the platform, wherein the platform includes a first opening extending through the platform; conveying a molding device to the injection station and disposing the molding device between the injector and the platform, wherein the molding device includes a first mold, a second mold over the first mold and a mold cavity defined by the first mold and the second mold; disposing a plunger under the molding device and the platform, wherein the plunger includes a base and a rod extendable toward the molding device and retractable toward the base; moving the injector towards the molding device to communicate with the mold cavity; applying a plunging force on the molding device by extending the rod through the first opening towards the molding device; and injecting a molding material from the injector into the mold cavity.

In some embodiments, the method further includes locking the molding device on the platform before injection; unlock the molding device from the platform after injection; withdrawing the injector from the molding device after the injection; retracting the rod towards the base after the injection; moving the plunger away from the injection station after the retraction; and conveying the molding device away from the injection station after the withdrawal of the injector and the retraction of the rod.

In some embodiments, the molding device and the plunger are conveyed into the injection station simultaneously. In some embodiments, the rod contacts the molding device during the application of the plunging force. In some embodiments, the method further includes aligning the injector with the rod before and during injecting the molding material. In some embodiments, the plunger is fixedly disposed under the molding device and the first opening. In some embodiments, the method further includes providing a clamping force to clamp the first mold and the second mold during the conveying of the molding device and the injection of the molding material.

An aspect of this disclosure relates to an injection molding method. The method includes providing a carrier, wherein a first molding device and a second molding device are held by the carrier; providing an injection station including a platform and an injector disposed over the platform, wherein the platform includes a first opening extending through the platform; providing a plunger disposed under the platform, wherein the plunger includes a base and a rod extendable from and retractable toward the base; moving the first molding device into the injection station and disposing the first molding device between the injector and the platform; providing a plunging force to the first molding device by extending the rod through the first opening to contact the first molding device; injecting a molding material from the injector into the first molding device; withdrawing the injector and the rod from the first molding device after injection; moving the first molding device from the injection station; and moving the second molding device into the injection station and disposing the second molding device between the injector and the platform.

In some embodiments, the method further includes providing the plunging force to the second molding device by extending the rod through the first opening to contact the second molding device; injecting the molding material from the injector into the second molding device; withdrawing the injector and the rod from the second molding device after the injection; moving the second molding device away from the injection station.

In some embodiments, the platform is fixedly disposed under the carrier, and the injector is fixedly disposed over the carrier and overlapped with the first opening from a top view. In some embodiments, the first molding device and the second molding device are moved into the injection station by rotation of the carrier. In some embodiments, the method further includes moving the plunger to dispose under the carrier and the injection station while the carrier is stationary, or moving the carrier to dispose the plunger under the carrier while the plunger is stationary. In some embodiments, the injection station and the plunger are movable, and the carrier is stationary.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. An injection molding system, including:
    an injection station including a platform and an injector disposed over the platform, wherein the platform includes a first opening extending through the platform;
    a molding device disposed between the platform and the injector and over the first opening, wherein the molding device includes a mold cavity and a clamping unit for clamping the molding device; and
    a plunger disposed under the platform and molding device and movable into and out of the injection station, wherein the plunger includes a base and a rod, the rod is extendable through the first opening to contact the molding device and retractable toward the base and away from the molding device,
    wherein the molding device and the clamping unit are movable together relative to the platform, the plunger is disposed out of the molding device,
    the molding device is disposed between a first mold base and a second mold base disposed over and engageable with the first mold base, and is surrounded by the clamping unit, and
    the first mold base is disposed between the clamping unit and the platform when the molding device is disposed on the platform.

2. The injection molding system of claim 1, wherein the plunger is not in contact with the platform.

3. The injection molding system of claim 1, wherein the rod is vertically aligned with the injector.

4. The injection molding system of claim 1, wherein the molding device further includes a first mold disposed in the first mold base and a second mold disposed over and corresponding to the first mold, and the clamping unit is disposed between the first mold base and the second mold base.

5. The injection molding system of claim 4, wherein the first mold base includes a second opening configured to receive at least a portion of the rod, and the second opening is overlapped with the first opening from a top view.

6. The injection molding system of claim 5, wherein a direction of an injecting force is from the injector towards the second opening.

7. The injection molding system of claim 5, wherein the rod is extendable into the second opening and configured to provide a plunging force to the molding device.

8. The injection molding system of claim 1, further comprising a locking device configured to lock the molding device on the platform, wherein the locking device includes a first locking element disposed on the molding device and a second locking element disposed on the platform and corresponding to the first locking element.

9. The injection molding system of claim 8, wherein the first locking element is a part of the molding device, and the second locking element is a part of the platform.

10. An injection molding system, including:
   an injection station including a platform, an injector disposed over the platform and a chamber under the platform, wherein the platform includes a first opening extending through the platform and communicable with the chamber;
   a first molding device disposed between the platform and the injector and over the first opening and including a first mold base, a second mold base opposite to the first mold base, a mold cavity surrounded by the first mold base and the second mold base, and a clamping unit disposed between the first mold base and the second mold base and configured for clamping the first molding device, wherein the first molding device and the clamping unit are movable away from the injection station, and the clamping unit and the platform are separable from each other; and
   a plunger disposed under the platform and movable into and out of the chamber, wherein the plunger includes a base and a rod, the rod is extendable through the first opening to contact and press the first molding device and retractable toward the base and away from the first molding device,
   wherein the first molding device, the plunger, the first mold base, the second mold base and the clamping unit are movable together relative to the platform.

11. The injection molding system of claim 10, wherein the first molding device is disposed in the injection station and is at a closed configuration by a clamping force from the clamping unit.

12. The injection molding system of claim 10, further comprising:
   a carrier holding the first molding device,
   wherein the platform is fixedly disposed under the carrier, and the injector is fixedly disposed over the carrier and overlapped with the first opening from a top view.

13. The injection molding system of claim 12, wherein the injection station and the plunger are movable, and the carrier is stationary.

14. The injection molding system of claim 12, wherein the first molding device is moved into or away from the injection station by rotation of the carrier.

15. The injection molding system of claim 12, further comprising:
   a second molding device disposed adjacent to the first molding device and held by the carrier.

16. The injection molding system of claim 10, wherein the clamping unit provides a clamping force to clamp the first molding device during the conveying of the first molding device.

17. The injection molding system of claim 10, wherein the mold cavity of the first molding device maintains at a predetermined pressure by a clamping force applied to the first molding device by the clamping unit.

18. An injection molding system, including:
   an injection station including a platform, an injector disposed over the platform, and a housing disposed under the platform, wherein the platform includes a first opening extending through the platform;
   a molding device disposed between the platform and the injector and over the first opening, wherein the molding device includes a mold cavity defined by a first mold and a second mold disposed over and corresponding to the first mold, and a clamping unit for clamping the molding device and separable from the platform;
   a first mold base and a second mold case disposed over the first mold base, wherein the molding device is disposed between the first mold base and the second mold base and is surrounded by the clamping unit;
   a locking device configured to lock the molding device on the platform, wherein the locking device includes a first locking element disposed on the first mold base and a second locking element disposed on the platform and engageable with the first locking element; and
   a plunger disposed under the platform and molding device and entirely surrounded by the housing and the platform, wherein the plunger includes a base and a rod, the rod is extendable through the first opening toward the molding device and configured to apply a plunging force on the molding device, the rod contacts the first mold during application of the pushing force and presses the first mold toward the second mold, and the rod is retractable toward the base,
   wherein the molding device and the clamping unit are movable together relative to the platform,
   the plunger is disposed out of the molding device, and
   the first mold base is disposed between the clamping unit and the platform when the molding device is disposed on the platform.

19. The injection molding system of claim 18, wherein the rod applies the pushing force to the first mold during application of the pushing force.

20. The injection molding system of claim 18, wherein at least a portion of the first mold is disposed between the rod and the mold cavity during application of the pushing force.

* * * * *